(12) United States Patent
Ice

(10) Patent No.: US 8,098,493 B2
(45) Date of Patent: Jan. 17, 2012

(54) CFP MECHANICAL PLATFORM

(75) Inventor: Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 806 days.

(21) Appl. No.: 12/203,027

(22) Filed: Sep. 2, 2008

(65) Prior Publication Data

US 2010/0039778 A1 Feb. 18, 2010

Related U.S. Application Data

(60) Provisional application No. 61/089,393, filed on Aug. 15, 2008.

(51) Int. Cl.
*H05K 1/14* (2006.01)
(52) U.S. Cl. ........ 361/741; 361/816; 439/374; 713/503; 345/175; 174/366
(58) Field of Classification Search ............... 361/719, 361/704, 816, 709, 761; 439/607.2, 374, 439/79, 607.1, 536; 713/193, 500, 158, 503, 713/189, 184; 345/172, 157, 175; 174/99 R, 174/366, 660
See application file for complete search history.

(56) References Cited

U.S. PATENT DOCUMENTS

| | | | |
|---|---|---|---|
| 5,342,216 A | | 8/1994 | Davis et al. |
| 5,506,373 A | * | 4/1996 | Hoffman ........................ 174/373 |
| 5,859,766 A | | 1/1999 | Van Scyoc et al. |
| 5,879,173 A | * | 3/1999 | Poplawski et al. ............ 439/138 |
| 5,920,459 A | | 7/1999 | Weber et al. |
| 6,788,540 B2 | | 9/2004 | Kruger et al. |
| 6,811,413 B2 | | 11/2004 | Keeble et al. |
| 6,816,376 B2 | | 11/2004 | Bright et al. |
| 6,821,140 B2 | | 11/2004 | Wu |
| 6,870,746 B2 | | 3/2005 | Leeson et al. |
| 6,875,056 B1 | | 4/2005 | Bianchini et al. |
| 6,890,206 B2 | | 5/2005 | Distad et al. |
| 6,893,293 B2 | | 5/2005 | Ice et al. |
| 6,920,050 B2 | * | 7/2005 | Little et al. .................... 361/736 |
| 6,986,679 B1 | | 1/2006 | Aronson et al. |

(Continued)

FOREIGN PATENT DOCUMENTS

KR 10-2006-0074839 7/2006

OTHER PUBLICATIONS

U.S. Appl. No. 12/466,244, filed Apr. 2010, Office Action.

(Continued)

*Primary Examiner* — Hung Duong
(74) *Attorney, Agent, or Firm* — Maschoff Gilmore & Israelsen

(57) ABSTRACT

In one example embodiment, a host device includes a host bezel, first and second guides, and a host connector. The host bezel defines an opening configured to receive a pluggable module. A first cutout on one side of the opening and a second cutout on the opposite side of the opening are adapted to receive corresponding guiderails on the module. The first and second guides are coupled to the host bezel and to a host printed circuit board. Each of the first and second guides defines a channel configured to receive the first and second guiderails of the module. The host connector is coupled to the host printed circuit board and is disposed at the back end of the first and second guides. The host connector includes a recessed slot configured to receive a module connector to electrically couple the module to the host printed circuit board.

28 Claims, 22 Drawing Sheets

U.S. PATENT DOCUMENTS

| | | |
|---|---|---|
| 7,033,202 B2 | 4/2006 | Wu |
| 7,046,516 B2 | 5/2006 | Lee et al. |
| 7,048,452 B2 | 5/2006 | Malagrino, Jr. |
| 7,145,773 B2 | 12/2006 | Shearman et al. |
| 7,215,549 B2 | 5/2007 | Kim |
| 7,239,515 B2 | 7/2007 | Bulman-Fleming et al. |
| 7,470,139 B2 | 12/2008 | Miki et al. |
| 2005/0213871 A1 | 9/2005 | Schwiebert et al. |
| 2006/0044774 A1 | 3/2006 | Vasavda et al. |
| 2007/0207670 A1 | 9/2007 | Stewart et al. |
| 2008/0137306 A1 | 6/2008 | Kim |

OTHER PUBLICATIONS

U.S. Appl. No. 12/466,244, filed Jul. 2010, Terminal Disclaimer.
International Search Report and Written Opinion for PCT/US2009/053933 dated Feb. 26, 2010.

\* cited by examiner

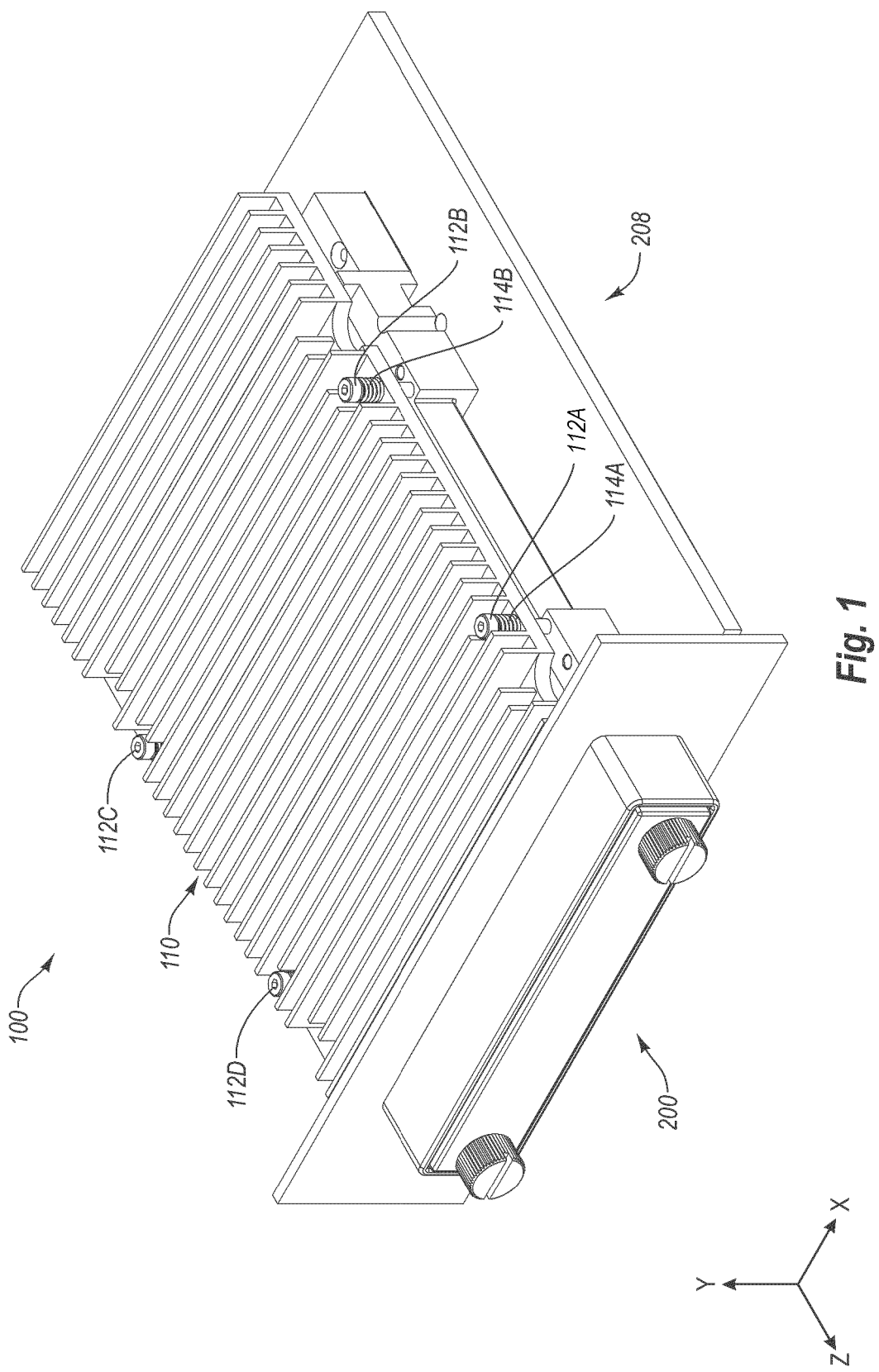

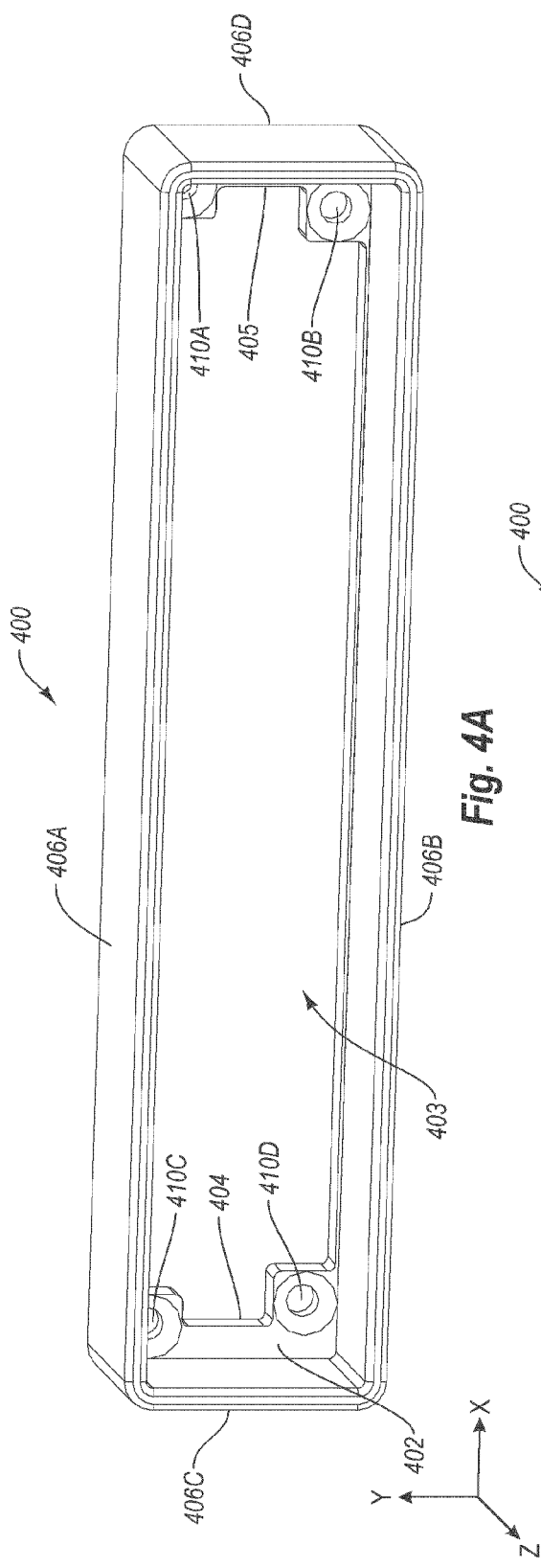
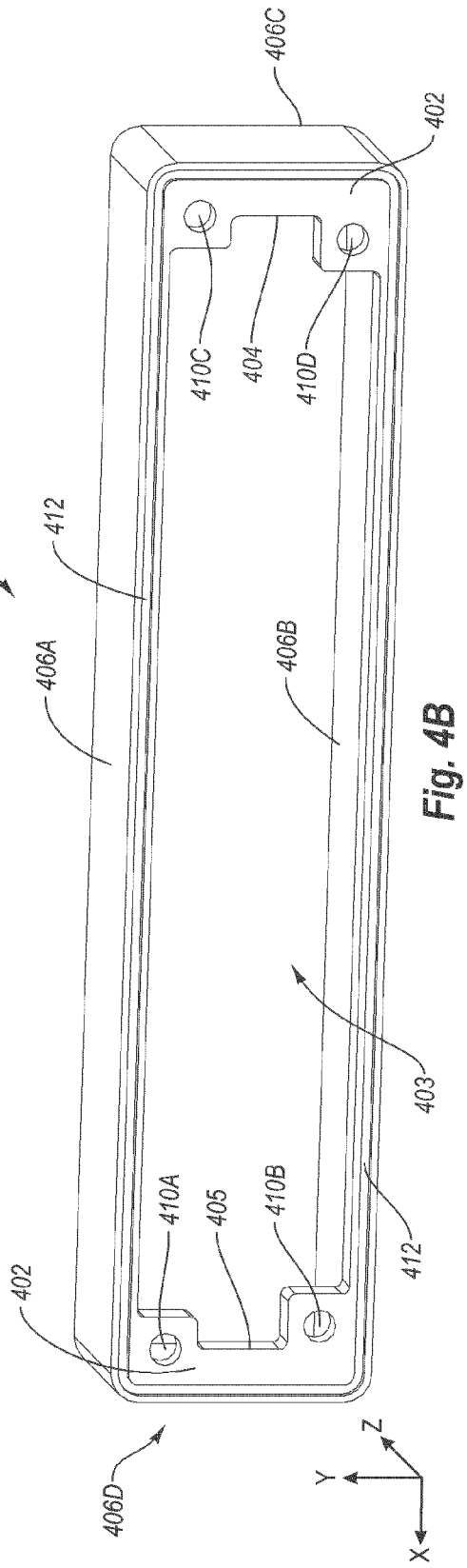
Fig. 4A
Fig. 4B

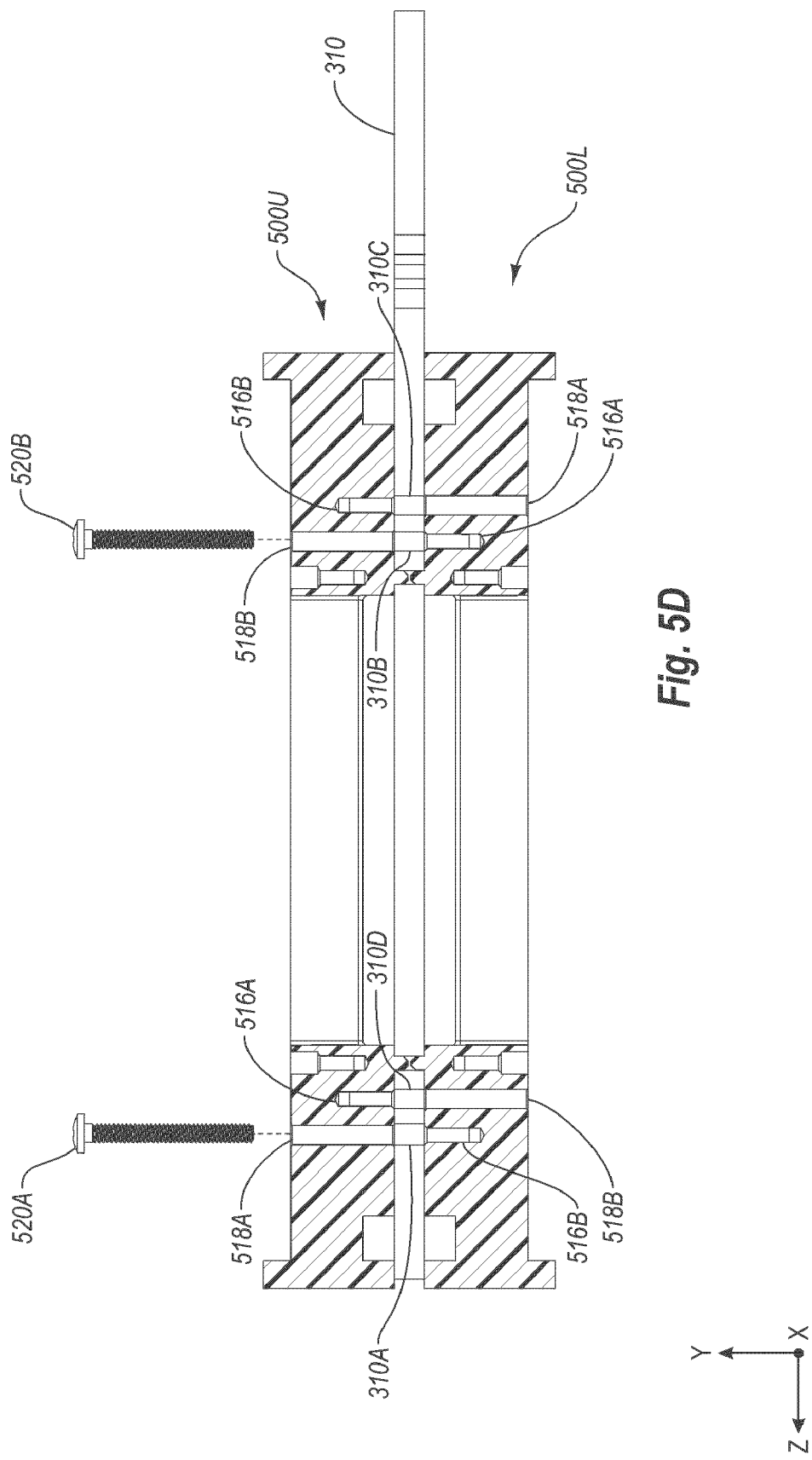

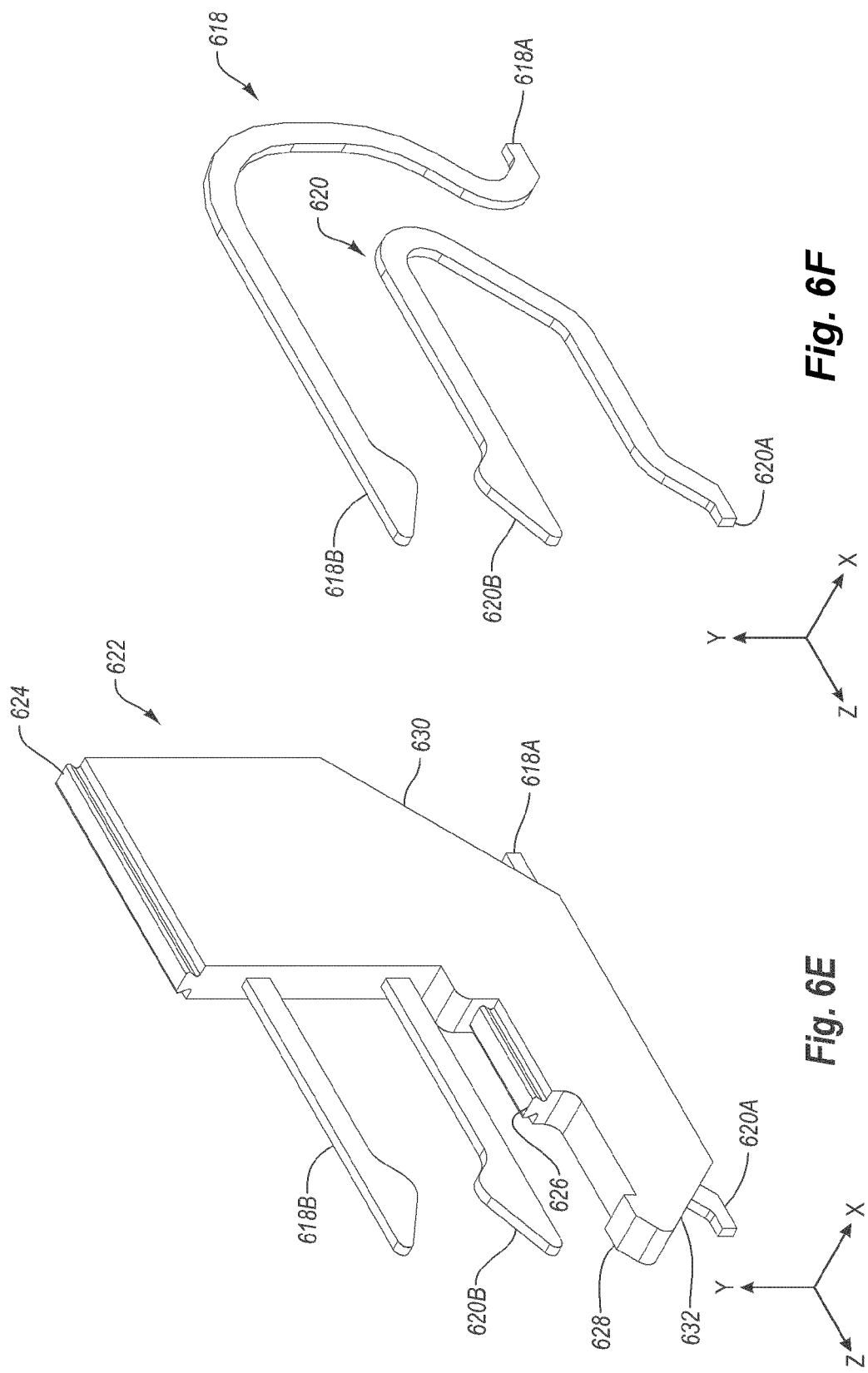

CFP MECHANICAL PLATFORM

CROSS-REFERENCE TO RELATED APPLICATIONS

The present application claims the benefit and priority to U.S. Provisional Application Ser. No. 61/089,393, entitled "PLUGGABLE TRANSCEIVER MODULE AND HOST DEVICE WITH THUMBSCREW DESIGN," filed Aug. 15, 2008, which application is fully incorporated herein by reference in its entirety.

BACKGROUND OF THE INVENTION

1. The Field of the Invention

The present invention generally relates to high speed optoelectronic modules and host devices. In particular, some example embodiments relate to a mechanical platform for pluggable modules and host devices 2. The Related Technology Conventional mechanical platforms implemented in optical networks include a pluggable module configured to be plugged into a host device to convert electrical data signals to optical data signals and vice versa. Specific functionality, dimensions, and/or other functionality of such mechanical platforms are often standardized by a multi-source agreement ("MSA"), such as the X2 MSA, XPAK MSA, and/or XENPAK MSA, for example.

Traditional pluggable modules, including X2, XPAK, and XENPAK form-factor modules, include a narrow channel defined along opposite sides of the module that run the length of the module. Host devices include corresponding narrow guiderails. To plug such a module into a host device, the module channels are aligned with the host guiderails and the module is pushed into the host device, the module channels engaging the host guiderails to ensure proper alignment of the module within the host device. Once plugged in, a module connector in the back of the module and a host connector in the host device provide an electrical interface between the module and the host device.

Additionally, traditional pluggable modules are commonly secured in host devices by two short thumbscrews which engage threaded receptacles in the front panel of the host device. To this end, the module typically includes an oversize module front panel with two flanges that extend outward from opposing sides of the module, one thumbscrew being inserted through each flange. The flanges typically overlap a significant amount of the host front panel to provide enough metal for the thumbscrews to thread into. The overlap is increased by the requirement that the thumbscrews avoid the space behind the module front panel and the host front panel occupied by the module itself and the narrow guiderails of the host device.

As a result of the required overlap, the footprint of the module front panel and flanges extends significantly beyond the footprint of the main body of the module as viewed from the front of the module. Consequently, the maximum number of modules that can be plugged into a single host device is limited by the module front panel and flanges, and not by the main body of the module.

Further, the attachment of traditional pluggable modules to the front panel of the host device can make containment of electromagnetic interference ("EMI") at the back of the module difficult to achieve. Specifically, attaching the module to the front panel of the host device can result in a good EMI seal between the module flange and the host front panel. However, tolerance stackup in the plugging direction results in a highly variable position of the module connector with respect to the host connector from one module to another such that a conventional elastomeric EMI gasket, which has a limited compression range, positioned between the back of the module and the host connector is inadequate for providing EMI containment.

Additionally, the tolerance stackup is typically compensated for by increasing the length of contacts within the module connector and/or host connector. The increased contact length allows for greater variation in the position of the module connector with respect to the host connector. Additionally, however, the increased contact length increases EMI emissions of each lengthened contact and can result in large contact stubs that extend beyond the points of contact between contacts in the module connector and contacts in the host connector. The large stubs create inductive discontinuities that degrade high speed signal integrity and further exacerbate EMI emissions.

On the other hand, the back of the module can be secured directly to the host connector, rather than securing the module front panel directly to the host front panel, to improve the EMI seal at the interface between the back of the module and the host connector. Such an arrangement would additionally allow shorter contact lengths to be used in the module connector and host connector as tolerance stackup would not be an issue at that interface. However, the tolerance stackup would then have to be dealt with at the interface between the module front panel and the host front panel, preventing the module front panel from being directly secured to the host front panel and compromising the EMI seal at that interface.

Additionally, some MSAs specify belly-to-belly configurations where a first module is positioned on top of a host printed circuit board ("PCB") and a second module is positioned upside down on the bottom of the host PCB directly beneath the first module. In such a configuration, the two modules are usually separated by only a few millimeters, or little more than the thickness of the host PCB. The presence of the oversized module front panel in the X2, XENPAK and other pluggable modules precludes belly-to-belly configurations with these modules since the oversized module front panel prevents the modules from being positioned sufficiently close together.

Moreover, thickness tolerances for PCBs are usually plus or minus ten percent. The resulting large variations in PCB thickness from one PCB to the next make it difficult to design host systems that can absorb the variations.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

In general, example embodiments of the invention relate to a mechanical platform for pluggable modules and host devices.

In one example embodiment, a host device includes a host bezel, first and second guides, and a host connector. The host bezel defines an opening configured to receive a pluggable module. A first cutout on one side of the opening and a second cutout on the opposite side of the opening are adapted to receive corresponding guiderails on the module. The first and second guides are coupled to the host bezel and to a host printed circuit board. Each of the first and second guides defines a channel configured to receive the first and second guiderails of the module. The host connector is coupled to the host printed circuit board and is disposed at the back end of the first and second guides. The host connector includes a recessed slot configured to receive a module connector to electrically couple the module to the host printed circuit board.

In another example embodiment, a host bezel includes a base configured to be coupled to a host device and defining an opening configured to receive a module when the module is plugged into the host device. A first cutout is formed on one side of the opening and a second cutout is formed on the opposite side of the opening. The first and second cutouts are configured to receive corresponding guiderails of the module. A rim extends forward from the base and is configured to form a wiping contact shield with the module against leakage of electromagnetic interference through the interface between the rim and the module.

In yet another example embodiment, a host guide includes a first end with one or more flanges configured to secure the host guide to a first side of a host bezel in a host device when the host guide has a first orientation. A length member is coupled to the first end. A second end is coupled to the length member and includes one or more flanges configured to secure the host guide to a second side of the host bezel when the host guide has a second orientation. The first end, length member, and second end define a channel configured to receive a guiderail on a side of a module when the module is plugged into the host device.

In yet another example embodiment, a host connector includes a connector core and a connector cover. The connector core defines a recessed slot configured to receive a module connector. The connector core includes a plurality of contacts configured to be soldered to corresponding solder pads on a host printed circuit board and configured to be coupled to corresponding contacts on the module connector. The connector core is further configured to allow visual inspection of the solder joints formed by soldering the contacts of the connector core to the corresponding solder pads on the host printed circuit board. The connector cover defines a cavity configured to receive the connector core and is accessible via a first opening defined in a bottom face of the connector cover and a second opening defined in a front face of the connector cover.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 discloses an example mechanical platform including a host device and a pluggable optoelectronic module;

FIGS. 4A-4C disclose an example host bezel that can be implemented in the host device of FIG. 3;

FIGS. 5A-5D disclose an example host guide that can be implemented in the host device of FIG. 3;

FIGS. 6A-6H disclose example embodiments of a host connector that can be implemented in the host device of FIG. 3.

DETAILED DESCRIPTION OF THE PREFERRED EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

The embodiments disclosed herein are generally related to a mechanical platform for a pluggable optoelectronic module and a host device that is capable of receiving the pluggable optoelectronic module. The embodiments disclosed herein may be implemented on various types of optoelectronic modules of various operating speeds and various form factors, including, but not limited to, the emerging 100G Form-factor Pluggable ("CFP") Multi-Source Agreement ("MSA") form factor. As used herein, the term "optoelectronic module" includes modules having both optical and electrical components. Examples of optoelectronic modules include, but are not limited to transponders, transceivers, transmitters, and/or receivers. Optoelectronic modules can be used, for instance, in telecommunications networks, local area networks, metro area networks, storage area networks, wide area networks, and the like.

FIG. 1 illustrates an example mechanical platform 100 according to embodiments of the invention which includes an optional heatsink 110, a pluggable optoelectronic module 200 ("module 200"), and a host 300. As shown, the module 200 is configured to be plugged into the host 300 as will be explained in more detail to follow. In addition, the optional heatsink 110 is configured to be removably attached to the host 300.

In some embodiments, a plurality of shoulder screws 112A-112D removably secures the heatsink 110 to the host 300. Optionally, each of the shoulder screws 112A-112D can include a compression spring. For instance, each of shoulder screws 112A and 112B include compression spring 114A and 114B, respectively. The compression springs 114A, 114B are configured to bias the shoulder screws 112A and 112B upwards (e.g., in the positive y-direction) away from the host 300. When the shoulder screws 112A and 112B are aligned with corresponding holes on the host 300, a user can exert a downward force (e.g., in the negative y-direction) on the shoulder screws 112A and 112B to overcome the upward bias from compression springs 114A and 114B to install the shoulder screws 112A and 112B into the corresponding holes on the host 300. Once installed, the compression springs 114A-114B, and corresponding compression springs included with shoulder screws 112C-112D, serve to bias the heatsink 110 against the top surface of the module 200.

I. Pluggable Module

Figure 2A:
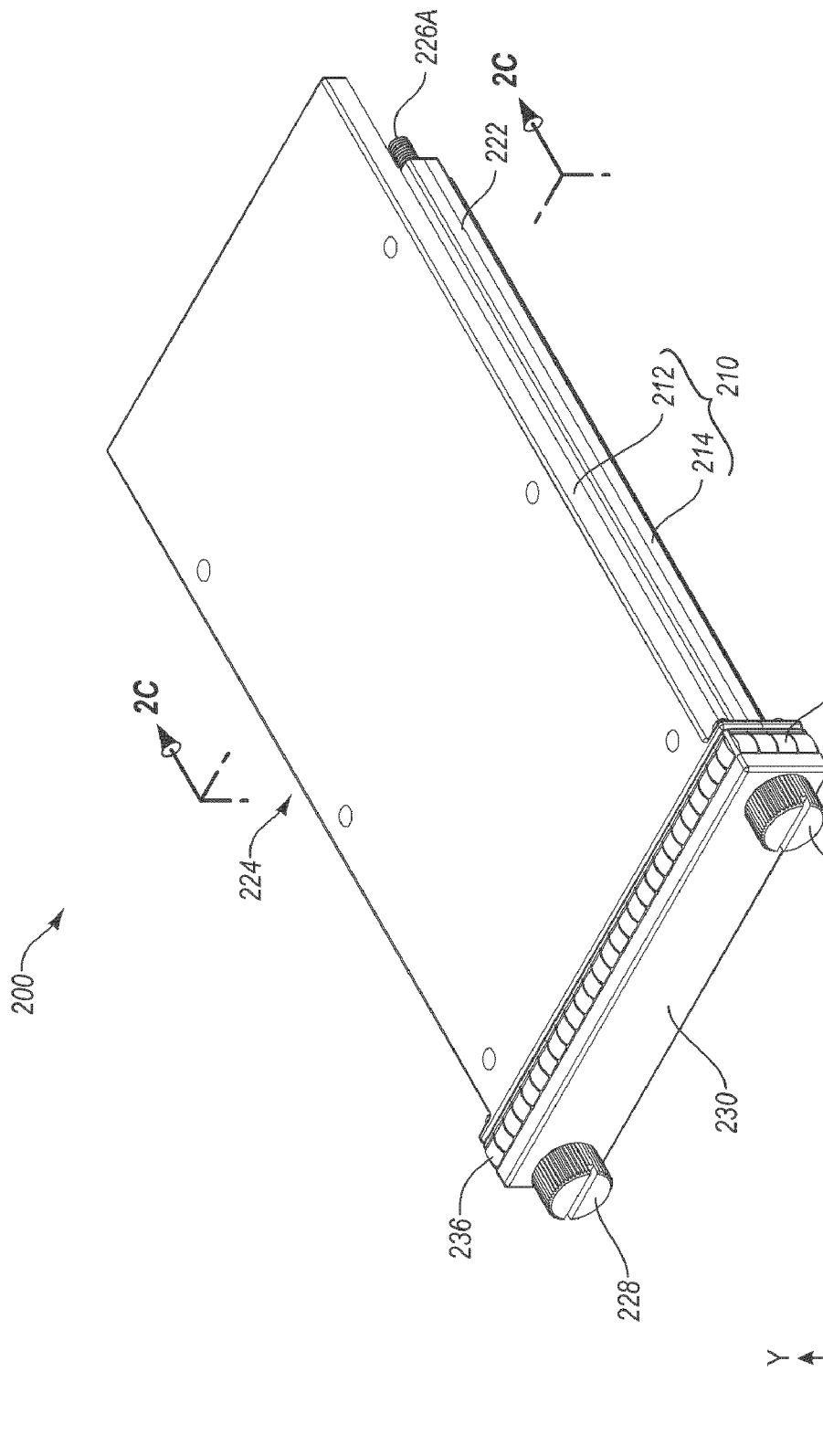
FIGS. 2A-2E disclose example embodiments of a pluggable optoelectronic module and module connector.
Figure 2B:
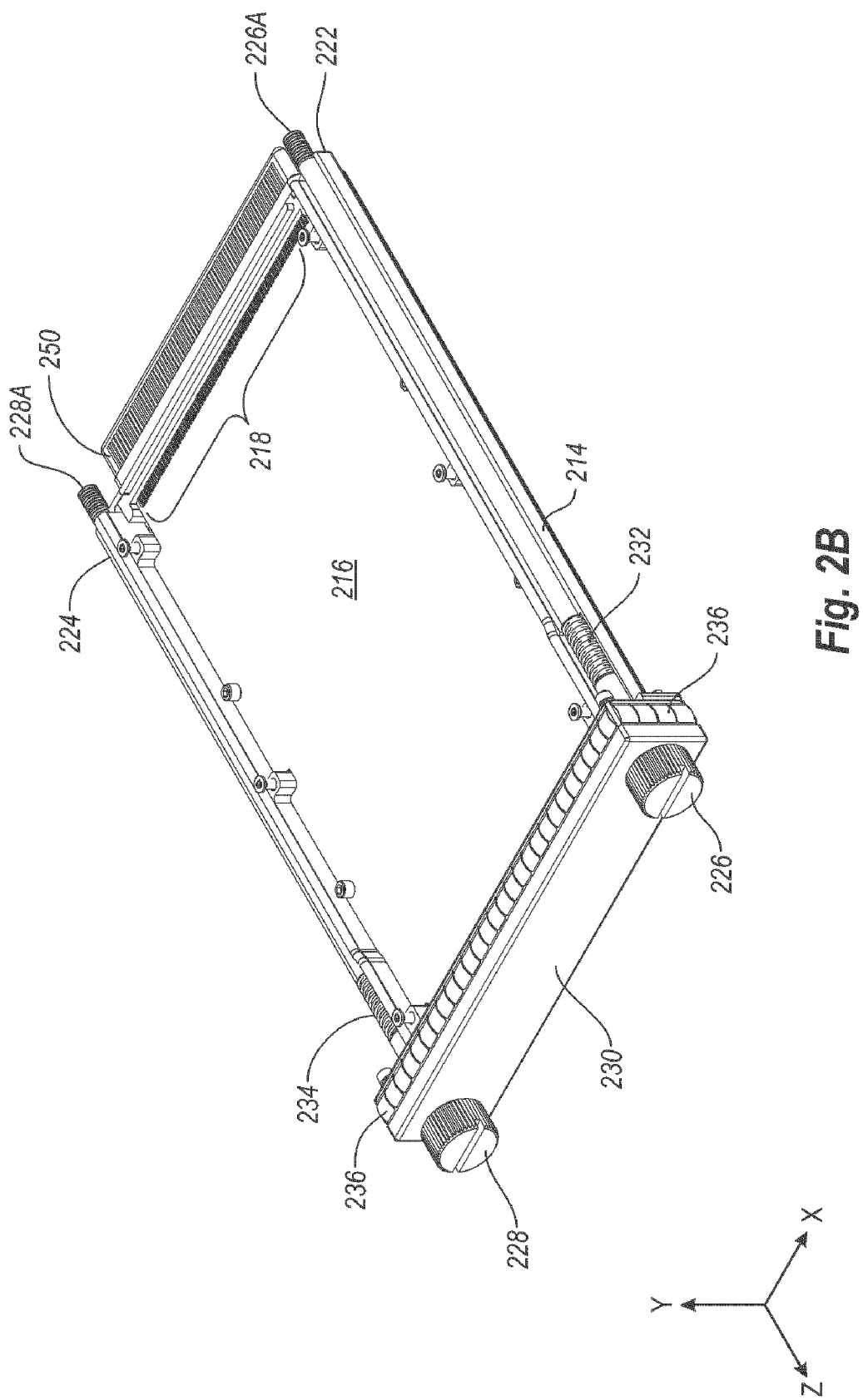
Figure 2C:
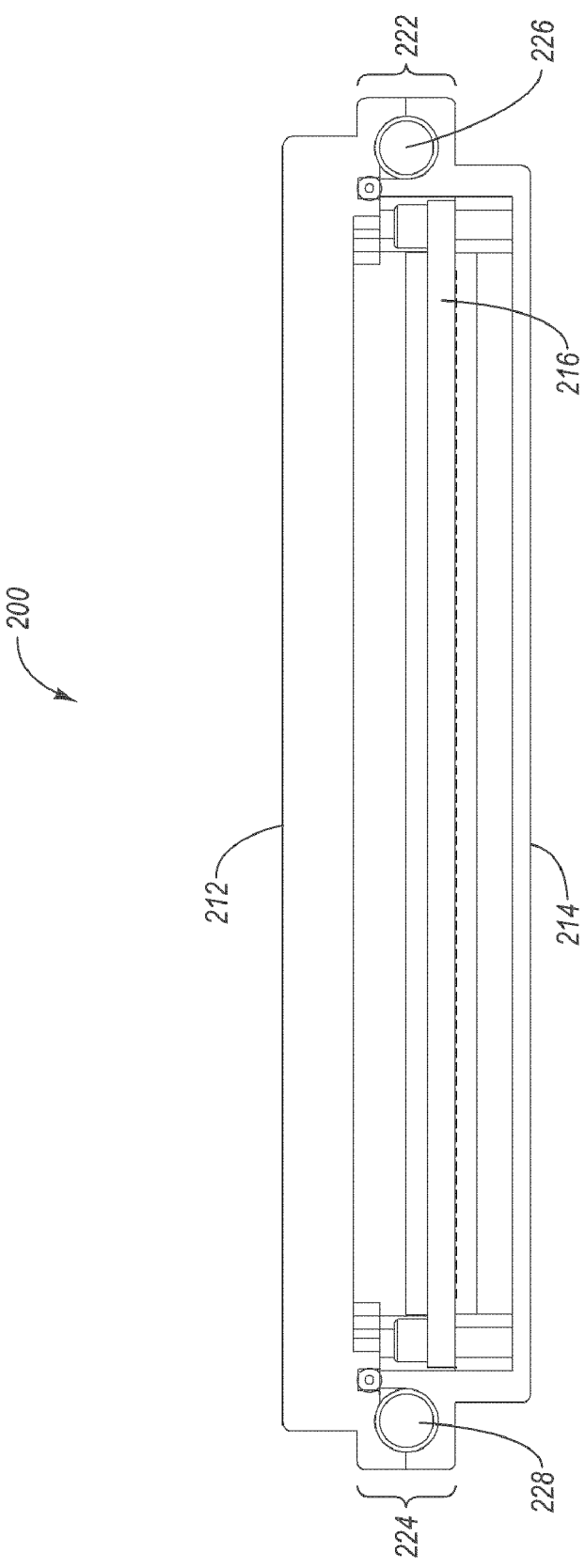
Figure 2D:
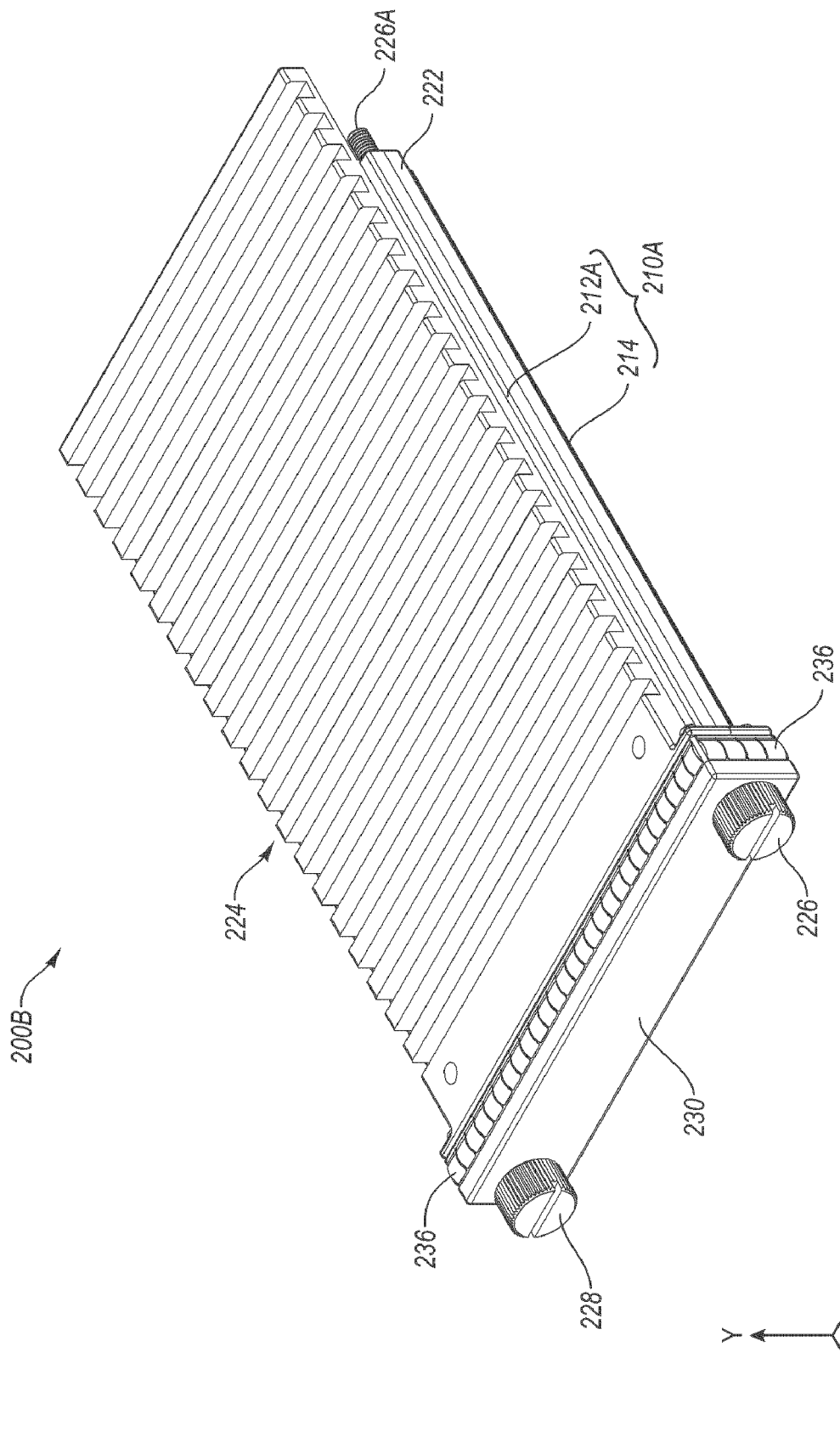
Figure 2E:
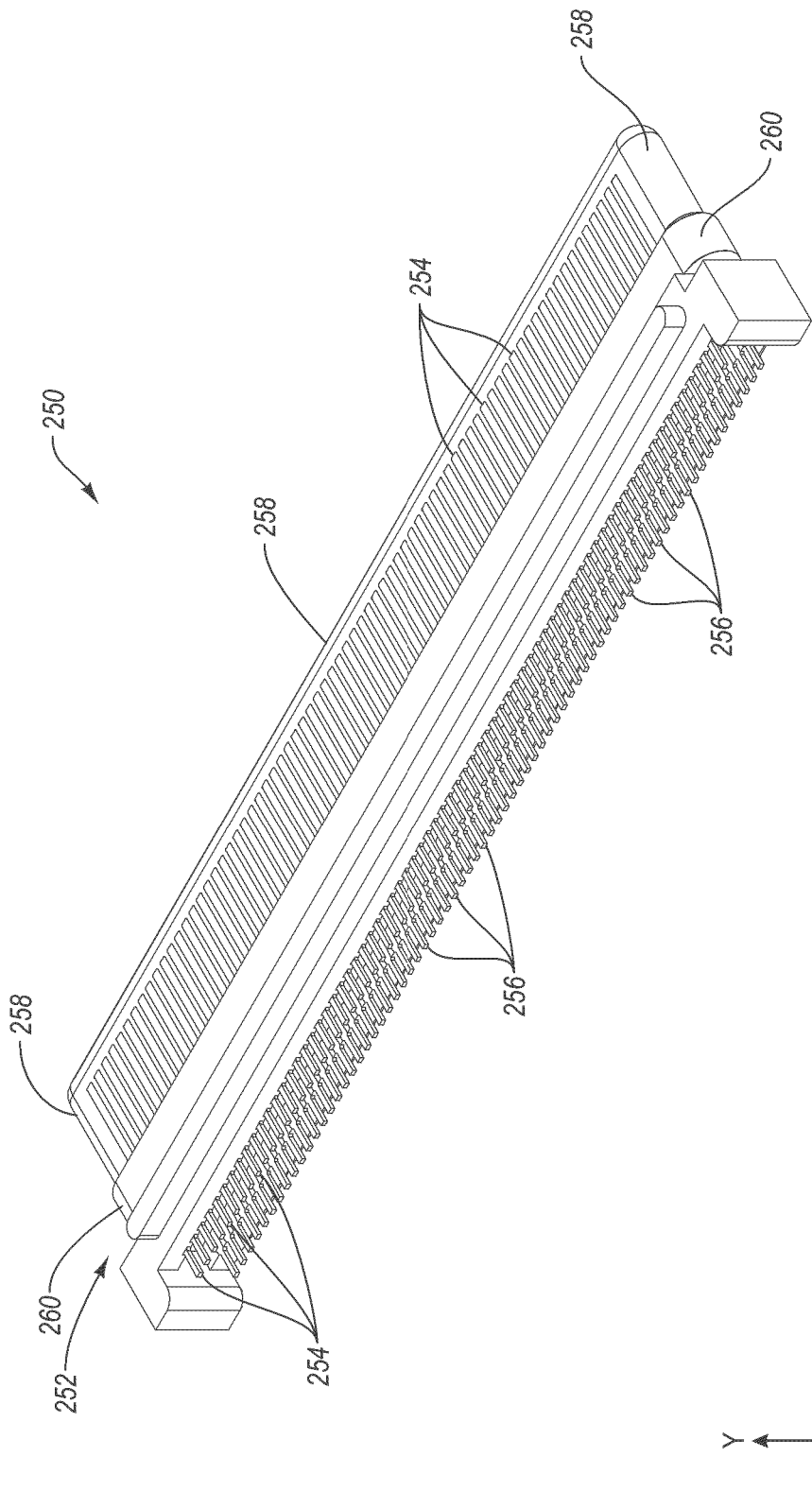

Reference is now made to FIGS. 2A, 2B, 2C and 2D, which disclose details of a pluggable optoelectronic module according to embodiments of the invention. In particular, FIGS. 2A and 2B disclose perspective views of the module 200, a top shell of the module 200 being removed in FIG. 2B. FIG. 2C discloses a cross-sectional view of the module 200. FIG. 2D discloses a perspective view of an alternative low power module 200B. FIG. 2E discloses a perspective view of a module connector that can be implemented in the modules 200, 200B of FIGS. 2A-2D.

As shown, the module 200 includes a shell assembly 210 comprising top shell 212 and bottom shell 214. Alternately, a monolithic shell can be implemented instead of a shell assembly 210. The top and/or bottom shell 212, 214 can be made using any reasonable material known in the art. Although not shown, a thermal pad, thermal gel, or other thermally conductive material can be placed on the top shell 212 when the module 200 is inserted into the host 300 to thermally couple the optional heatsink 110 to the module 200 and improve the ability of the optional heatsink 110 to receive and dissipate heat away from the module 200.

With additional reference to FIGS. 2B and 2C, The top and bottom shells 212, 214 are configured to enclose a printed circuit board ("PCB") 216, which can include various electronic, optical, and/or optoelectronic components coupled thereto. A pad pattern 218 extends from the PCB 216 into a module connector 250 configured to mate with a corresponding host connector (see FIGS. 6A-6H) of the host 300. The pad pattern 218 includes a plurality of contact pads, each contact pad configured to be coupled to a corresponding contact in the module connector 250.

Guiderails 222, 224 protrude laterally at the junction of the top shell 212 and bottom shell 214 from opposite sides of the module 200 and extend along the length of the module 200. However, it is not required in all embodiments that the guiderails 222, 224 protrude laterally at the junction of the top shell 212 and bottom shell 214. For instance, the guiderails can protrude from opposite sides of the module 200 above and/or below the junction of the top and bottom shells 212, 214 or from opposite sides of a module that includes a monolithic shell rather than a shell assembly 210. The guiderails 222, 224 are configured to engage channels on the host 300, as will be discussed in more detail to follow.

Thumbscrews 226 and 228 are housed within guiderails 222, 224 and protrude through module front panel 230 at the front of the module 200 and extend along the full length of the module 200, as best seen in FIG. 2B. A threaded end 226A and 228A of each thumbscrew 226 and 228, respectively, extends from the back of the module 200 for mating with the host 300.

In some embodiments, the thumbscrews 226 and 228 include a compression spring 232, 234 (FIG. 2B) located near the head of the thumbscrews 226 and 228. The compression springs 232, 234 are configured to bias the thumbscrews 226 and 228 in an outward position, which may be approximately 6 millimeters ("mm") in some embodiments. Prior to plugging the module 200 into the host 300, the ends 226A and 228A of thumbscrews 226, 228 are retracted into the guiderails 222, 224 due to the outward bias force exerted by the compression springs 232, 234.

When a user desires to plug the module 200 into the host 300, the user aligns the guiderails 222, 224 with corresponding channels on the host 300 and pushes the module 200 into the host 300. At that time, the user can exert an inward pressure on the heads of the outwardly biased thumbscrews 226 and 228 to overcome the outward biasing effect of the compression springs 232, 234, which causes the threaded ends 226A, 228A to enter corresponding threaded holes in the host 300. The user can then tighten the thumbscrews 226, 228 to securely fasten the module 200 into host 300.

The module 200 additionally includes an electromagnetic interference ("EMI") collar 236 surrounding the front of the module 200. The EMI collar 236 operates in conjunction with a host bezel (see FIGS. 4A-4B) to create an EMI shield around the front of the module 200 when plugged into the host 300.

With additional reference to FIG. 2D, a second embodiment 200B of a pluggable module is illustrated that can alternately or additionally be implemented in the mechanical platform 100 of FIG. 1. In particular, the module 200B can be implemented for low profile, low power applications. The module 200B is similar in some respects to the module 200 of FIGS. 1 and 2A and includes guiderails 222, 224 and integrated thumbscrews 226, 228. However, the module 200B has a shell assembly 210A that includes a top shell 212A with an integrated low profile heatsink, in contrast to the smooth top shell 212 of FIG. 2A. Additionally, the module 200B is configured for low power applications. In some embodiments of the invention, the optional heatsink 110 is omitted from the mechanical platform 100 when the module 200B is implemented.

With additional reference to FIG. 2E, the module connector 250 is disclosed in greater detail. The module connector 250 includes a body 252 and a plurality of contacts 254, 256. The body 252 comprises plastic dielectric in some embodiments, although the body 252 can alternately or additionally comprise other reasonable materials. The body 252 includes a tongue 258 configured to be inserted into a corresponding recessed slot of a host connector (see FIGS. 6A-6H). In some embodiments, the tongue 258 is a different thickness, measured in the y-direction, than the PCB 216. For instance, the tongue 258 can be approximately 2.2 millimeters thick in some embodiments while the PCB 216 is less than 2.2 millimeters thick. Alternately, the tongue 258 and PCB 216 can be substantially the same thickness in other embodiments. The tongue 258 is surrounded by a shoulder 260, which is also configured to be inserted into the corresponding recessed slot of the host connector. As will be discussed further below, the insertion of the shoulder into the recessed slot of the host connector reduces air exposure to the contacts 254, 256 of the module connector 250.

The contacts 254, 256 include a plurality of upper contacts 254 and a plurality of lower contacts 256, both of which are partially embedded on the top and bottom surfaces, respectively, of the tongue 258. The contacts 254, 256 then extend forwards from the body 252. The forward-extending portions of the contacts 254, 256 are configured to straddle mount on the edge of the PCB 216. More particularly, the forward-extending portions of the upper contacts 254 are configured to couple to contact pads included in the pad pattern 218 on the top surface of the PCB 216 while the forward-extending portions of the lower contacts 256 are configured to couple to contact pads included in the pad pattern 218 on the bottom surface (not shown) of the PCB 216. During assembly, after the module connector 250 has been straddle-mounted to the edge of the PCB 216, the forward-extending portions of the upper and lower contacts 254, 256 can be reflow soldered or otherwise coupled to corresponding contact pads of the pad pattern 218.

As previously mentioned, in some embodiments the tongue 258 is a different thickness than the PCB 216. The thickness difference of the tongue 258 and PCB 216 can enable the use of straight contacts 254, 256 (see FIG. 7A) rather than joggled contacts. The use of straight contacts 254, 256 can reduce and/or eliminate electrical discontinuities in the electrical path provided by the module connector 250 and can further simplify manufacturing of the module connector 250 in some embodiments.

II. Host

Figure 3:
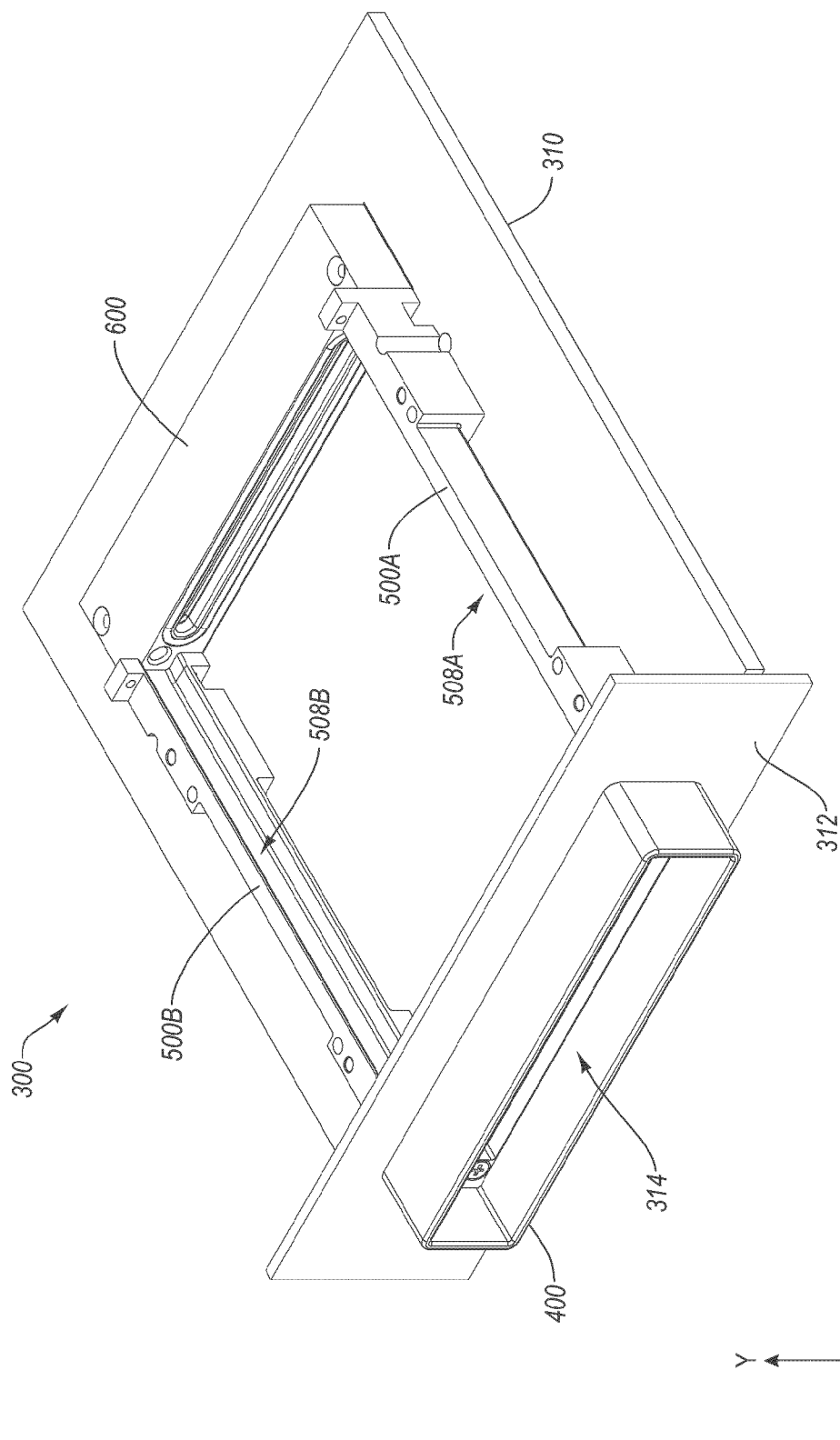
FIG. 3 discloses an example host device, including a host bezel, host guides, and host connector.

With additional reference to FIG. 3, additional details regarding the host 300 are disclosed. As shown, the host 300 includes a host PCB 310 configured to include various electronic, optical, and/or optoelectronic components. A front panel 312 provides protection for the host 300 and defines one or more openings 314 for receiving one or more modules 200.

The host 300 further includes a host bezel 400, host guides 500A and 500B, and host connector 600. Briefly, the host bezel 400 defines an opening configured to receive a module 200 and is configured to create an EMI shield around the front of the module in conjunction with EMI collar 236. The host bezel 400 is coupled through the front panel 312 to host guides 500A and 500B. Each of the host guides 500A, 500B defines a channel 508A, 508B configured to receive one of the guiderails 222 or 224 of the module 200. After the guiderails 222, 224 are aligned with channels 508A, 508B and the module 200 is inserted into the host 300, the back end of the module 200 contacts host connector 600 and the host connector 600 receives the module connector 250. The thumbscrews 226, 228 secure the module 200 to the host connector 600.

A. Host Bezel

In greater detail, and as disclosed in FIGS. 4A and 4B, the host bezel 400 includes a base 402 defining an opening 403 configured to receive the module 200. Guiderail cutouts 404 and 405 formed in the base 402 at the perimeter of the opening 403 are configured to receive the guiderails 224, 222 of module 200.

A rim extends forward (e.g., in the positive z-direction) from the base 402 and includes a top 406A, bottom 406B, and two sides 406C, 406D (collectively referred to as "rim 406"). The EMI collar 236 of the module 200 is configured to contact the interior surface of the rim 406 in a wiping motion when the module 200 is inserted into the host 300 to form an EMI shield at the interface of the host bezel 400 with the module 200. Thus, the contact formed between the EMI collar 236 and the interior surface of the rim 406 can be referred to as a "wiping contact." The wiping contact geometry between the EMI collar 236 and the interior surface of the rim 406 is configured to be tolerant of large variations in tolerance stackup in the z-direction.

A plurality of through holes 410A, 410B, 410C and 410D (referred to collectively as "through holes 410") are formed in the base 402. Each of the through holes 410 is configured to receive a fastener, such as a screw, bolt, or the like, for coupling the host bezel 400 to guiderail 500A, 500B through host panel 312, as will be described in greater detail below.

Although not required in all embodiments, the opening 403 in FIGS. 4A and 4B is asymmetric with respect to the x-axis and substantially symmetric with respect to the y-axis. The asymmetry with respect to the x-axis in this example prevents the module 200 from being inserted incorrectly into the host 300 since the cross section of the module 200, shown in FIG. 2C, is only complementary to the opening 403 in a single orientation relative to the opening 403. Alternately or additionally, the opening 403 defined in the host bezel 400 can be substantially symmetric or asymmetric with respect to both the x-axis and the y-axis.

According to embodiments of the invention, the base 402 can further include a channel (not shown) configured to receive an EMI gasket 412 disclosed in FIG. 4B. The EMI gasket 412 is configured to form an EMI shield at the interface of the host bezel 400 with the front panel 312 of the host 300 and can include elastomeric materials or other reasonable materials.

The host bezel 400 can be made from any reasonable material and can be die-cast, machined, or the like. Although illustrated as a separate component from the front panel 312 of FIG. 3, the host bezel 400 can alternately be integrally formed with the front panel 312 as a single component.

Figure 4C:
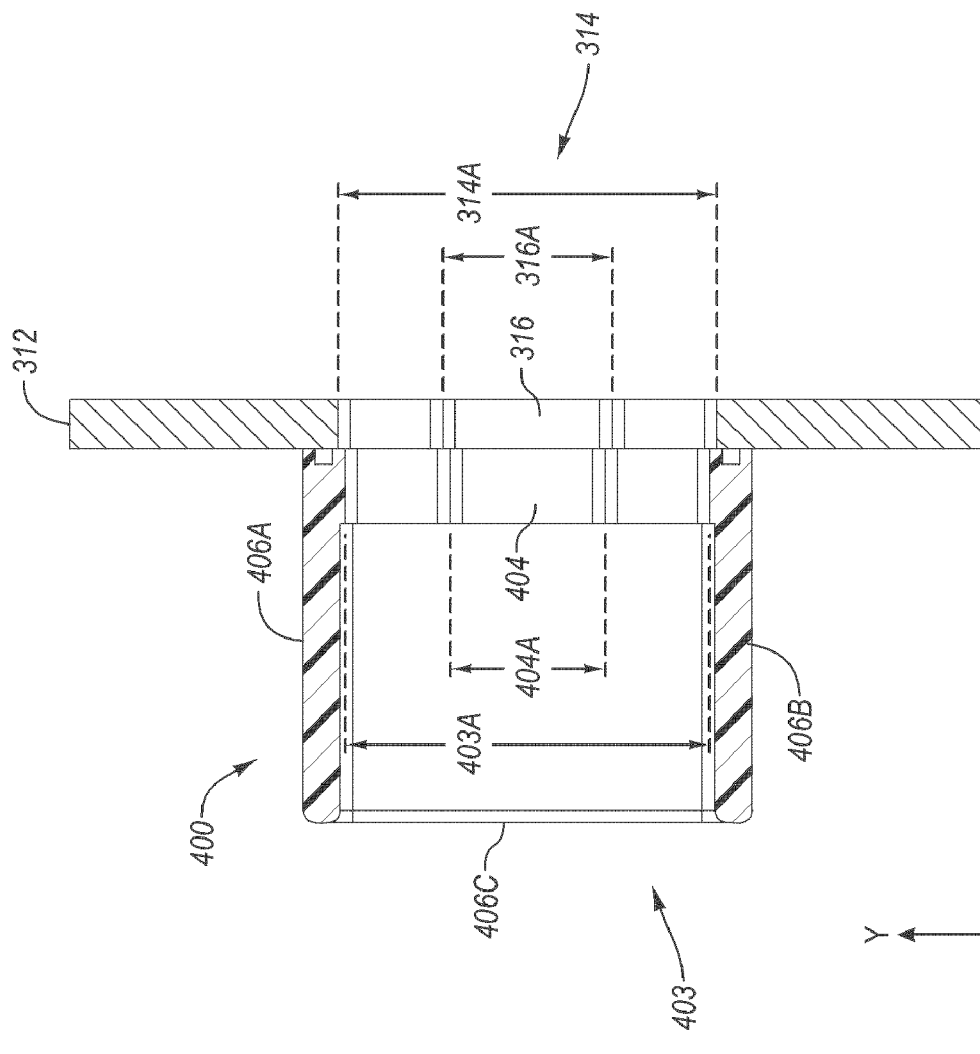

According to embodiments of the invention, the host bezel 400 can be implemented with a front panel 312 defining an opening 314 that is larger than the opening 403, as best seen in FIG. 4C. In particular, FIG. 4C discloses a cross-section in the y-z plane of the host bezel 400 in a potential assembled orientation relative to the front panel 312. As shown, the front panel 312 includes a guiderail cutout 316 formed in the front panel 312 at the perimeter of the opening 314. Notably, the height 316A of the guiderail cutout 316 is greater than the height 404A of the guiderail cutout 404. Similarly, the height 314A of the opening 314 is greater than the height 403A of the opening 403. A plurality of oversized through holes configured to align with the through holes 410 can further be formed in the front panel 312. As a result of the oversize opening 314 and oversized through holes in the front panel 312, the position of the host bezel 400—and consequently that of the host guides 500A, 500B—can be adjusted up or down (e.g., in the positive or negative y-direction) relative to the front panel 312 to accommodate large mechanical assembly tolerances caused by thickness variation in the host PCB 310.

B. Host Guide

Figure 5A:
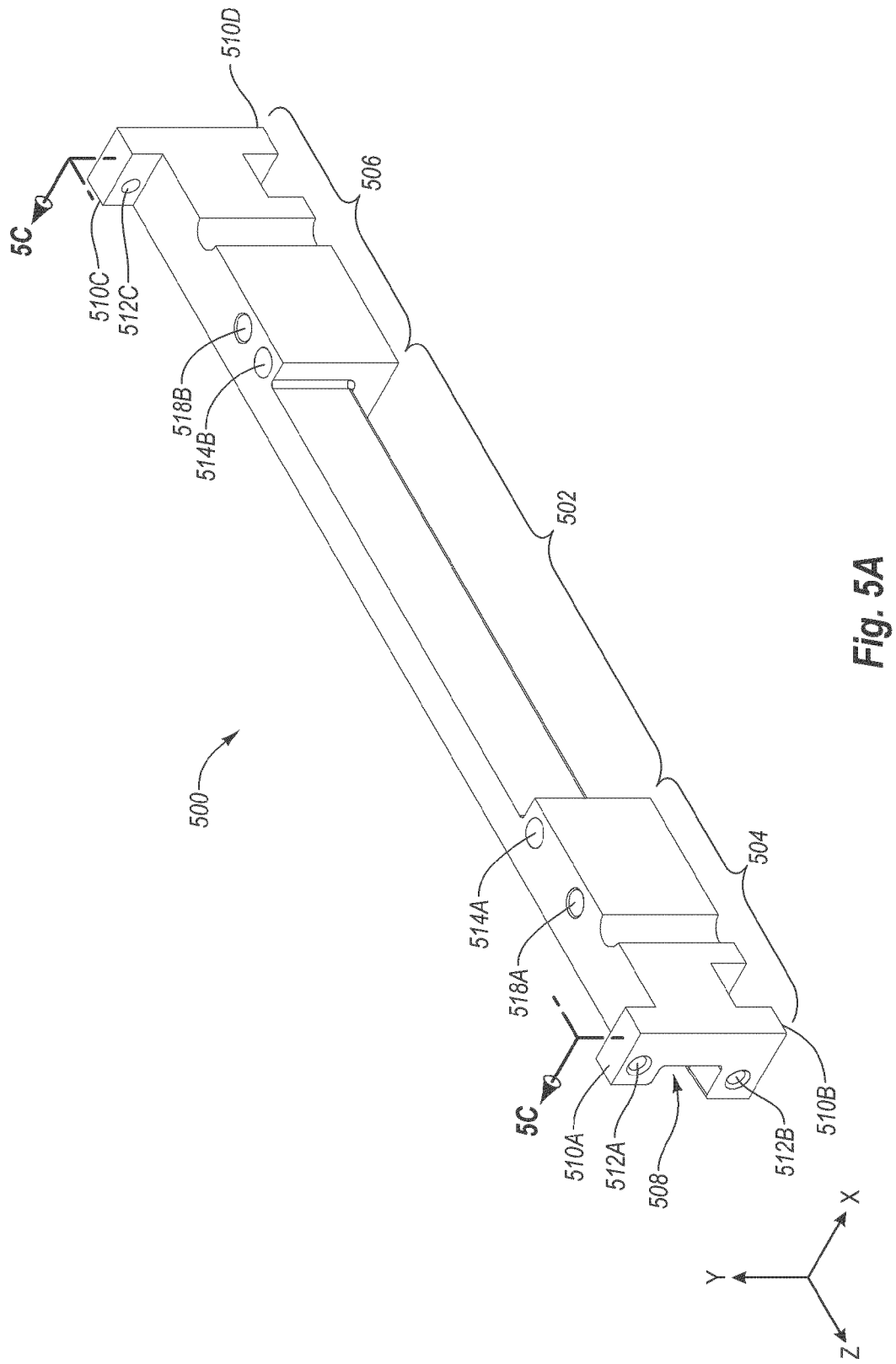
Figure 5B:
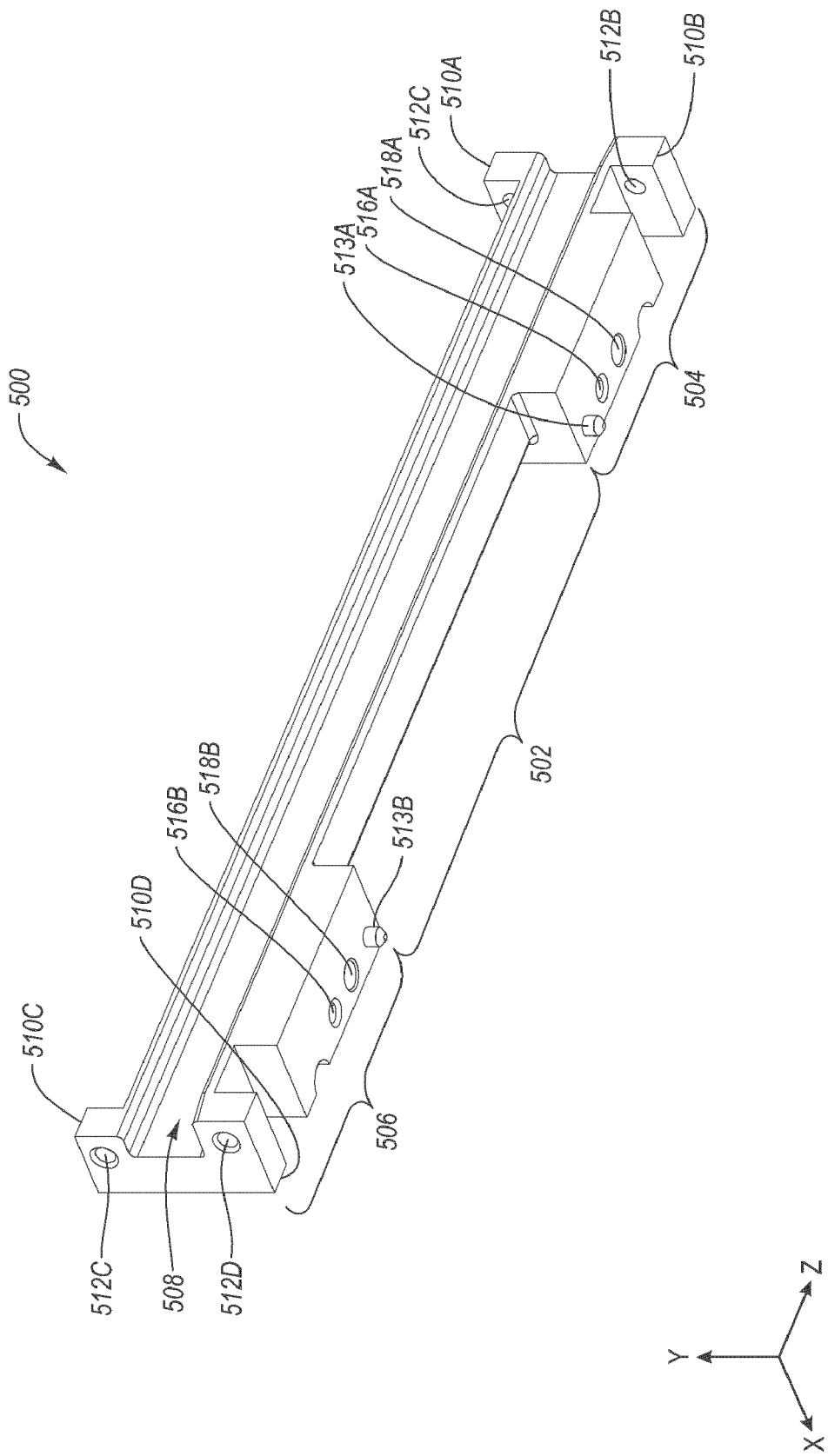

One embodiment of a universal host guide 500 is disclosed in FIGS. 5A and 5B that may correspond to the host guides 500A and 500B of FIG. 3. According to this embodiment, the host guide 500 can be oriented on one side of the host 300 of FIG. 3 as host guide 500A and can be oriented on the other side as host guide 500B. The host guide 500 can be formed of any reasonable material, including, but not limited to, aluminum, or the like.

The host guide 500 includes a length member 502, a first end 504, and a second end 506. A channel 508 is defined along the length of the host guide 500 from the first end 504 and along the length member 502 to the second end 506. The channel 508 is configured to receive a corresponding guiderail 222 or 224 of the module 200 when the module is inserted into the host 300. Each of the first end 504 and the second end 506 include a plurality of flanges 510A-510B and 510C-510D, respectively, formed on the first end 504 and the second end 506. A plurality of tapped holes 512A-512D are defined in the flanges 510A-510D. As used herein, a "tapped hole" refers to a through hole or a cavity that contains internal threads.

In some embodiments, the tapped holes 512A-512D allow the host bezel 400 to be secured to the host guide 500 via a plurality of screws, bolts, or the like. In particular, tapped holes 512A and 512B on the host guide 500 are configured to be respectively aligned with through holes 410A and 410B, and corresponding through holes in the front panel 312, when the host guide 500 is in the orientation of host guide 500A. Alternately, tapped holes 512C and 512D are configured to be respectively aligned with through holes 410C and 410D, and corresponding through holes in the front panel 312, when the host guide 500 is in the orientation of host guide 500B. Once the tapped holes 512A-512B of a first host guide 500 and tapped holes 512C-512D of a second host guide 500 are respectively aligned with through holes 410A-410B and 410C-410D of the host bezel, and corresponding through holes in the front panel 312, a plurality of screws or other fasteners can be received through each set of aligned holes to secure the host bezel 400 to the first and second host guides 500.

In the embodiment shown in FIGS. 3 and 5A-5C, only two of the four tapped holes 512A-512D are used, depending on the orientation 500A or 500B of the host guide 500 within the host 300. For instance, when the host guide 500 is in the orientation of host guide 500A, tapped holes 512A-512B are used to secure the host guide 500 to the host bezel 400, while tapped holes 512C-512D remain unused. Alternately, when the host guide 500 is in the orientation of host guide 500B, tapped holes 512C-512D are used to secure the host guide 500 to the host bezel 400, while tapped holes 512A-512B remain unused. Thus, the two tapped holes 512A-512B or 512C-512D are used depending on which set are oriented at the front of host 300, or towards the front panel 312. Alternately, the unused tapped holes 512A-512B or 512C-512D can be used to secure the host guide 500 to the host connector 600 when the through holes 512A-512B or 512C-512D are oriented at the back of the host 300, or towards the host connector 600.

Returning to FIGS. 5A-5C, the host guide 500 can optionally include one or more posts 513A, 513B extending from the bottom of the host guide 500. The one or more posts are configured to be received within one or more corresponding cavities in the PCB 310 of FIG. 3 to help position the host guide 500 on the PCB 310 during assembly.

The host guide 500 further includes a first plurality of tapped holes 514A and 514B extending downward from the top of the host guide 500, a second plurality of tapped holes 516A and 516B extending upward from the bottom of the host guide 500 and a plurality of through holes 518A and 518B extending through the host guide 500 from top to bottom.

Figure 5C:
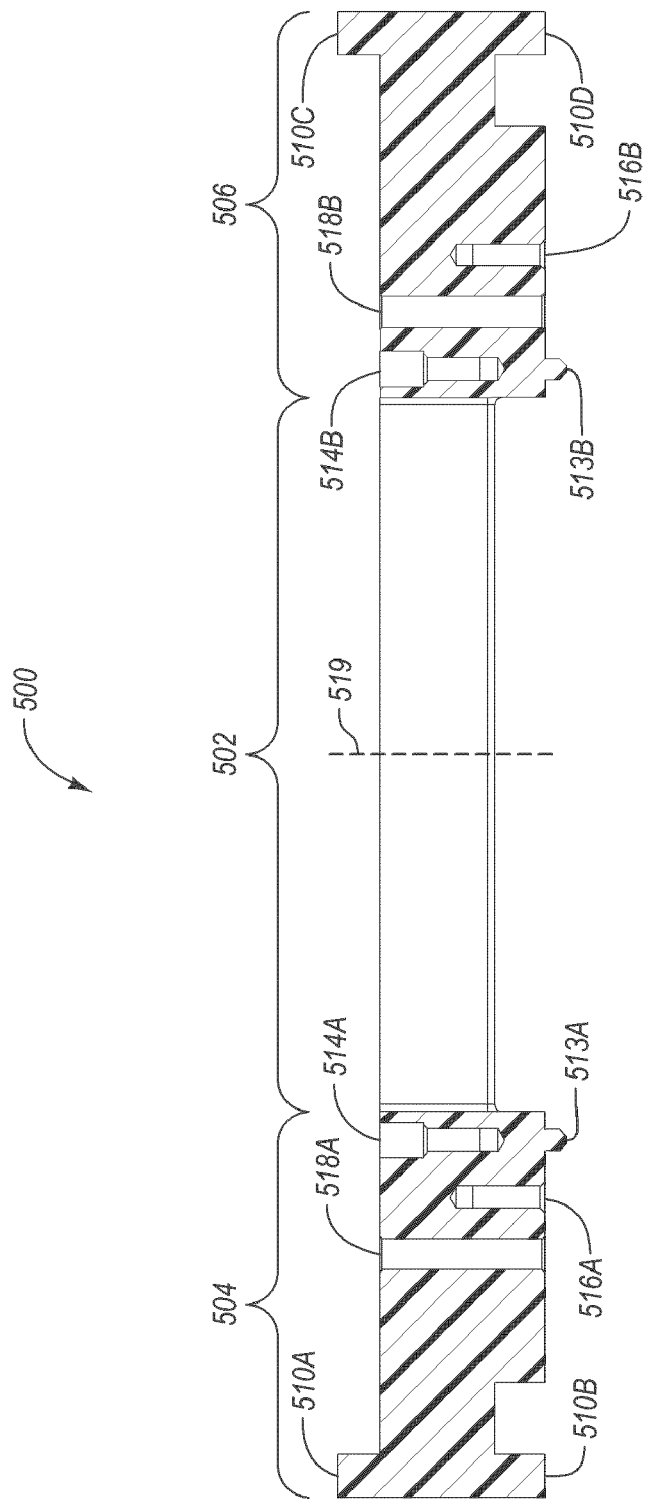

The first plurality of tapped holes 514A and 514B are configured to receive shoulder screws or other fasteners 112A-112D (see FIG. 1) for securing the optional heat sink 110 to the host guide 500. As shown in FIG. 5C, the tapped holes 514A and 514B are positioned in the host guide 500 substantially symmetrically about a reference axis 519 that bisects the host guide 500 and is parallel to the y-axis. Alternately or additionally, the tapped holes 514A and 514B can be positioned in the host guide 500 asymmetrically about the reference axis 519.

The second plurality of tapped holes 516A and 516B are configured to receive screws or other fasteners for securing the host guide 500 to the PCB 310 of FIG. 3. In particular, the tapped holes 516A and 516B are configured to align with through holes on the PCB 310 such that a screw or other fastener can be inserted through each set of aligned holes and threaded into the tapped holes 516A and 516B. As shown, the tapped holes 516A and 516B are positioned asymmetrically about the reference axis 519.

Through holes 518A and 518B are also positioned asymmetrically about reference axis 519. Notably, however, through hole 518A and tapped hole 516B are positioned substantially symmetrically about the reference axis 519 while through hole 518B and tapped hole 516A are also positioned substantially symmetrically about the reference axis 519. The symmetry about the reference axis 519 of each through hole 518A and 518B with a corresponding one of the tapped holes 516B and 516A, respectively, allows the host guide 500 to be used in belly-to-belly configurations where a host 300 is configured to receive a first module 200 on top of the PCB 310 and a second module 200 immediately beneath the first module on the bottom of the PCB 310. A cross-sectional view of an upper host guide ("host guide 500U") and a lower host guide ("host guide 500L") in a belly-to-belly configuration on a PCB 310 is disclosed in FIG. 5D.

For the belly-to-belly configuration, the host guide 500U is positioned right-side-up on top of the PCB 310 while the host guide 500L is positioned upside-down on the bottom of the PCB 310. Further, the host guide 500U is in the orientation of host guide 500A of FIG. 3 while the host guide 500L is in an upside-down orientation of host guide 500B of FIG. 3.

As shown, through hole 518A of the host guide 500U aligns with a first through hole 310A in the PCB 310 and with the tapped hole 516B of the host guide 500L. Similarly, through hole 518B of the host guide 500U aligns with a second through hole 310B in the PCB 310 and with the tapped hole 516A of the host guide 500L. After the through holes 518A and 518B of the host guide 500U are aligned with the through holes 310A and 310B of the PCB 310 and with the tapped holes 516B and 516A of the host guide 500L, fasteners 520A and 520B can be inserted through each set of aligned holes to secure the host guide 500U, PCB 310, and host guide 500L together.

Alternately or additionally, fasteners can be inserted from the host guide 500L through PCB 310 and into the host guide 500U using one or more other sets of aligned holes. For instance, one other set of aligned holes includes through hole 518A of the host guide 500L, third through hole 310C of the PCB 310, and tapped hole 516B of the host guide 500U. Yet another set of aligned holes includes through hole 518B of the host guide 500L, fourth through hole 310D of the PCB 310, and tapped hole 516A of the host guide 500U.

In a single-sided configuration where a module 200 is positioned only on the top or bottom of the PCB 310, but not on both the top and bottom of the PCB 310, the host guide 500 of FIGS. 5A-5C can be secured to the PCB 310 with two fasteners, including one fastener inserted through the PCB 310 into the tapped hole 516A and another fastener inserted through the PCB 310 into the tapped hole 516B. In the belly-to-belly configuration of FIG. 5D, both host guides 500U and 500L can be collectively secured to the PCB 310 with the same number of fasteners as in the single-sided configuration due to the symmetry about the reference axis 519 of each through hole 518A and 518B with a corresponding one of the tapped holes 516B and 516A, respectively. In comparison, however, the two fasteners used in the belly-to-belly configuration may be longer than the two fasteners used in the single-sided configuration.

C. Host Connector

Figure 6A:
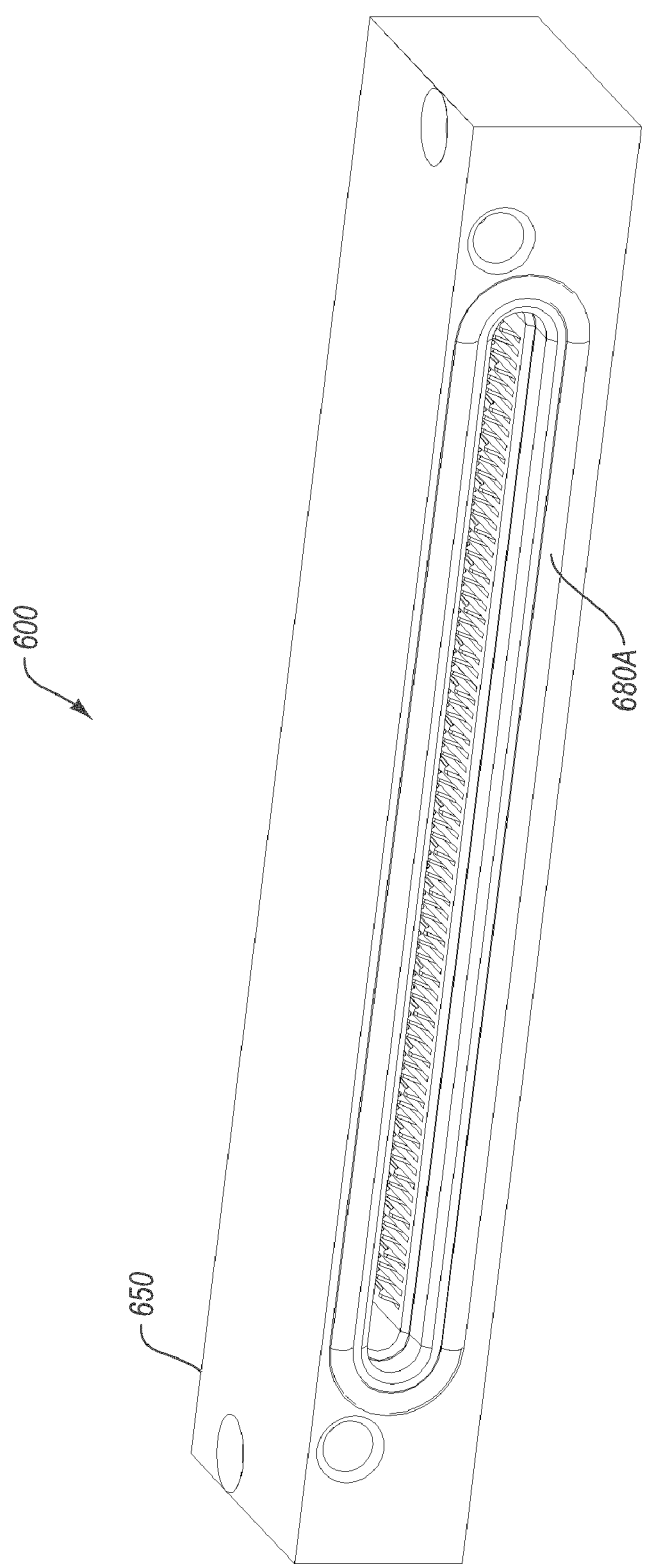
Figure 6B:
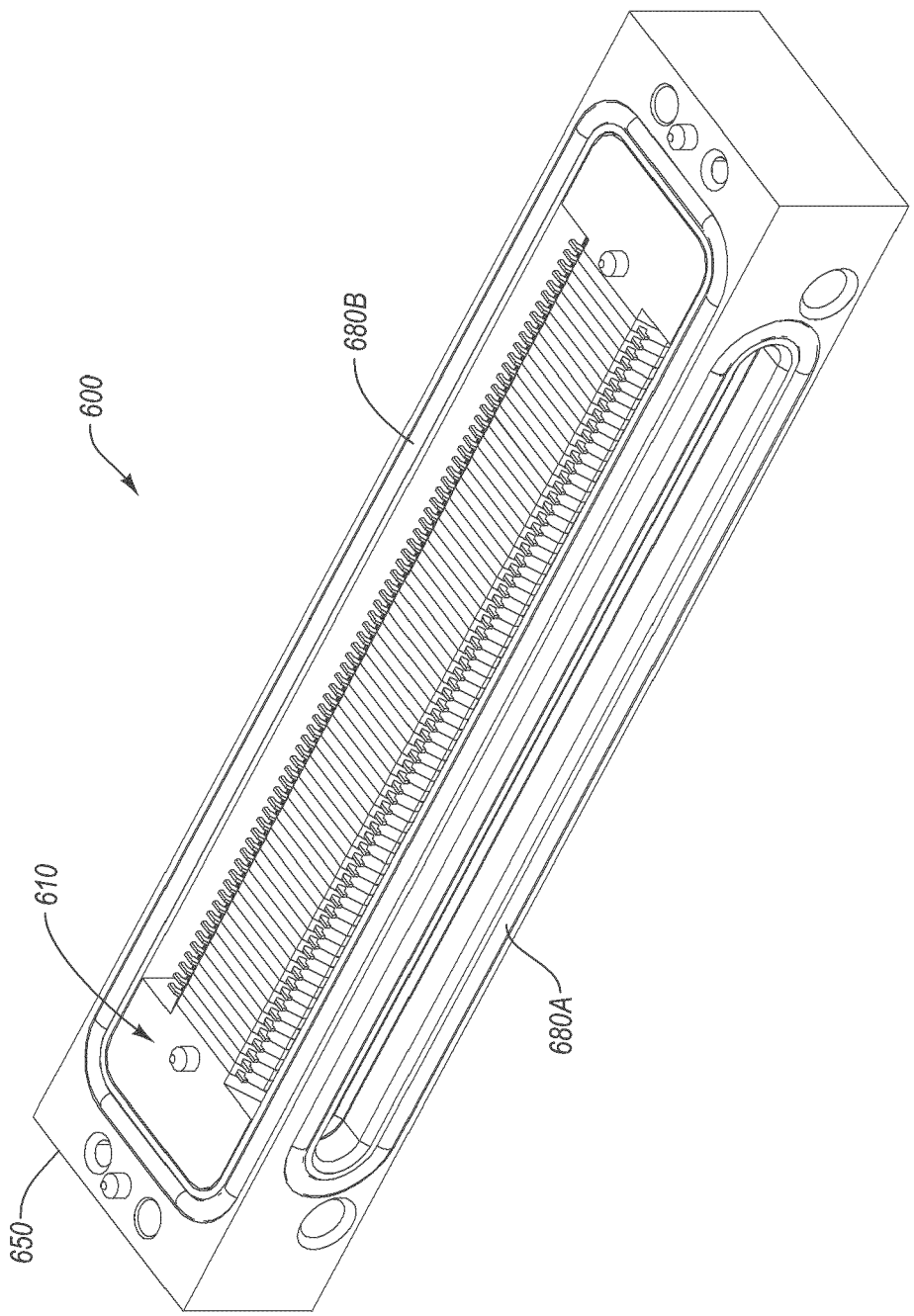
Figure 6C:
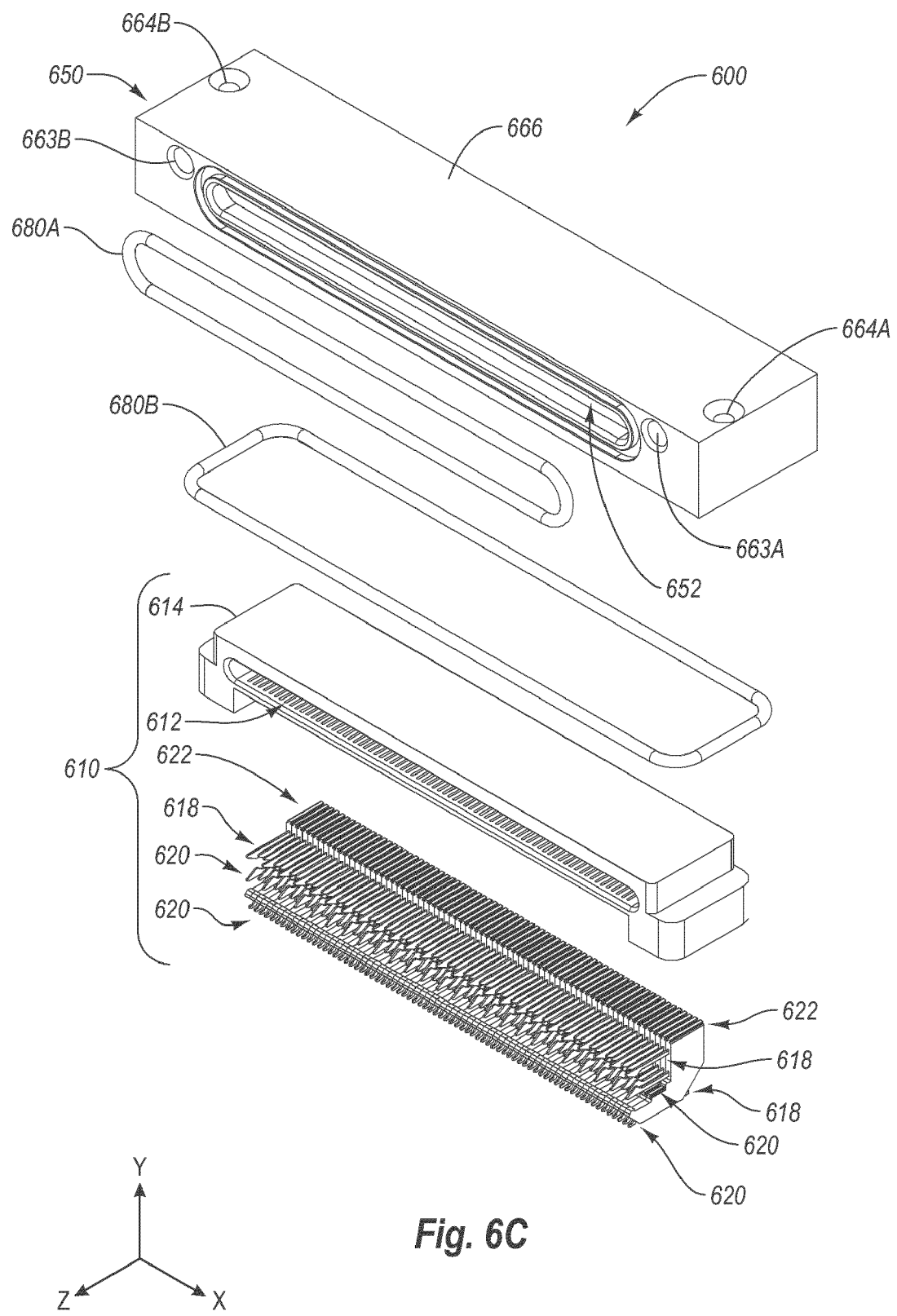

With additional reference to FIGS. 6A-6H, the host connector 600 is disclosed in greater detail. In particular, FIG. 6A discloses a front perspective view, FIG. 6B discloses a front upside-down perspective view, and FIG. 6C depicts an exploded view of the host connector 600. As shown, the host connector 600 includes a connector core 610 defining a recessed slot 612 (FIG. 6C) for receiving the module connector 250, a connector cover 650 defining a cavity 652 (FIG. 6C) for receiving the connector core 610, and EMI gaskets 680A and 680B configured to form an EMI shield at interfaces of the host connector 600 with the module 200 and the PCB 310.

Figure 6D:
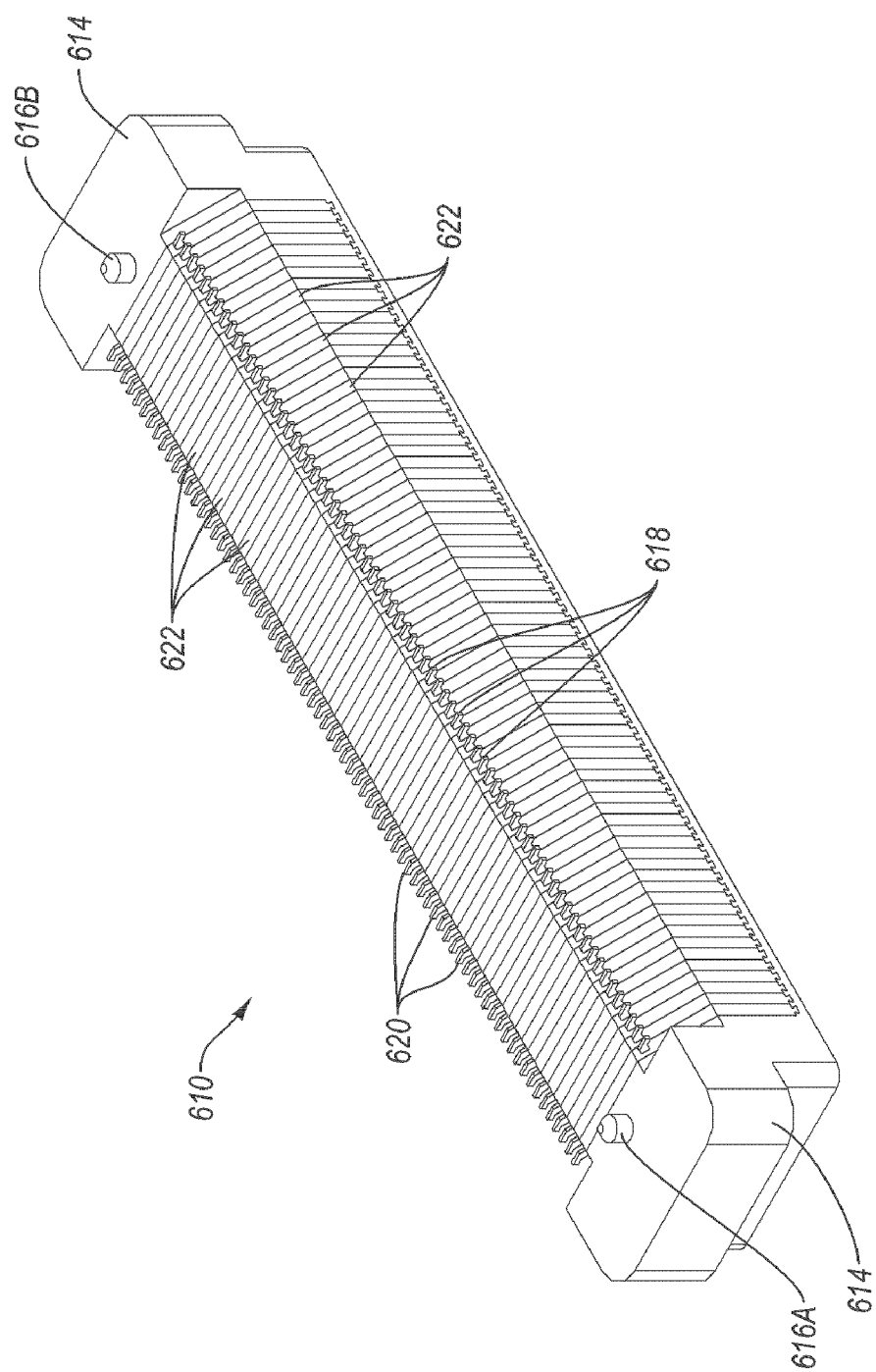

Together with FIG. 6C, FIG. 6D discloses details of the connector core 610 in greater detail. The connector core 610 includes a connector body 614. The recessed slot 612 is defined in the front face of the connector body 614. The connector body 614 comprises plastic dielectric in some embodiments, although the connector body 14 can alternately or additionally comprise other reasonable materials. The connector body 614 optionally includes one or more posts 616A, 616B extending from the bottom of the connector body 614. The one or more posts 616A, 616B are configured to be received within one or more corresponding cavities in the PCB 310 of FIG. 3 to help position the connector core 610 on the PCB 310 during assembly.

The connector core 610 additionally includes a plurality of contacts 618, 620 partially enclosed within a plurality of chicklets 622. In some embodiments, the chicklets 622 are made from plastic. Alternately or additionally, the chicklets can be made from other reasonable materials. Each chicklet 622 partially encloses two contacts 618 and 620, as best seen in FIG. 6E, with the two contacts 618 and 620 best seen in FIG. 6F.

Each of the chicklets 622 includes one or more guiderails 624, 626 configured to slide along corresponding channels defined in the connector body 614 in order to properly align the chicklets 622 and contacts 618, 620 within the connector body 614. In some embodiments, the chicklets 622 additionally include a hook feature 628 configured to secure the chicklets within the connector body 614. In some examples, the chicklet 622 slides into the connector body 614 and "snaps" into place with the hook feature 628.

The chicklets 622 additionally include cutaway profiles 630, 632 to provide solder joint visibility. In particular, each contact 618, 620 includes a foot 618A, 620A extending outwards from cutaway profiles 630 and 632 and further configured to be soldered or otherwise electrically coupled to corresponding contact pads on the PCB 310. During assembly, the connector core 610 can be positioned on the PCB 310 such that each of the feet 618A, 620A are aligned with corresponding contact pads on the PCB 310. After alignment, the feet 618A and 620A can be electrically coupled to the corresponding contact pads on the PCB 310 using a reflow solder process or other coupling process. Once the soldering process is complete, the cutaway profiles 630, 632 allow each solder joint between a foot 618A or 620A and corresponding contact pad on the PCB 310 to be visually inspected for quality control.

Each contact 618, 620 additionally includes an arm 618B, 620B. The arms 618B, 620B are configured to be coupled to corresponding upper and lower contacts 254, 256 on the module connector 250, as disclosed in further detail with respect to FIG. 7A below.

In some embodiments of contacts 618 and 620, high speed signal integrity is improved and EMI emission is significantly reduced compared to conventional host connector contacts due to the shape of the contact 620. In particular, the uniform conductor cross section and absence of conductive stubs eliminates impedance discontinuities that impair signal integrity and increase EMI emissions.

Figure 6G:
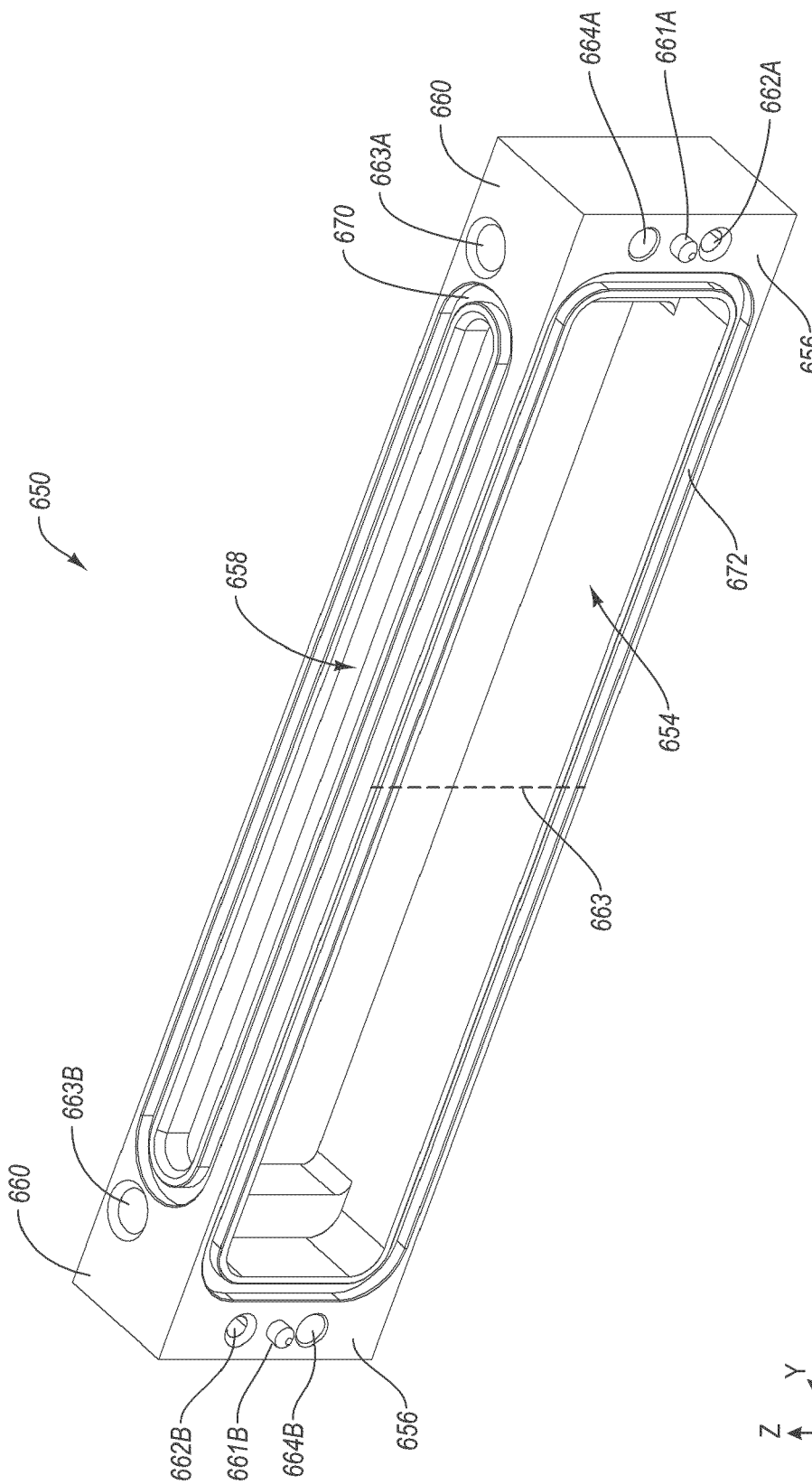

With combined reference now to FIGS. 6C and 6G, additional details of the connector cover 650 are disclosed. The connector cover 650 comprises metal in some embodiments. As already mentioned above, the connector cover 650 defines a cavity 652 (FIG. 6C) configured to receive the connector core 610. The cavity 652 is accessed via a first opening 654 defined in a bottom face 656 of the connector cover 650 and via a second opening 658 defined in a front face 660 of the connector cover.

Optionally, the connector cover 650 can include one or more posts 661A, 661B extending downwards from the bottom face 656. The one or more posts 661A, 661B are configured to be received within one or more corresponding cavities in the PCB 310 of FIG. 3 to help position the connector cover 650 on the PCB 310 during assembly.

A first plurality of tapped holes 662A, 662B are defined in the connector cover 650 that extend upwards from the bottom face 656 and that are positioned asymmetrically about a reference line 663 that bisects the plane of bottom face 656 and is parallel to the z-axis. The tapped holes 662A, 662B are configured to secure the host connector 600 to the PCB 310 of FIG. 3. During assembly, after the contacts 622 of the connector core 610 have been soldered to contact pads on the PCB 310, the connector cover 650 is dropped vertically over the connector core 610 via the opening 654 defined in the bottom face 656 of the connector cover 650 such that the connector core 610 is received within the cavity 652 of the connector cover 650 and such that the tapped holes 662A and 662B align with corresponding through holes on the PCB 310. Screws or other fasteners can then be inserted through the through holes in the PCB 310 and into the tapped holes 662A and 662B to secure the host connector 650 to the PCB 310.

A second plurality of tapped holes 663A, 663B are defined in the connector cover 650 that extend backwards from the front face 660. The tapped holes 663A, 663B are configured to receive the threaded ends 226A, 228A of the thumbscrew 226, 228 (FIG. 2B) to secure the module 200 to the connector cover 650. In some embodiments the threads in holes 663A and 663B may be implemented with threaded inserts for improved thread durability. The threaded inserts may be rigidly installed or have a small amount of float to aid thread alignment. In some embodiments, the front face 660 of the connector cover 650 acts as a hardstop within the host 300 for the module 200. Since the module 200 is fastened directly to the host connector cover 650, and the connector core 610 is mechanically isolated from the host connector cover 650, the connector core 610 is protected from mechanical damage caused by external stress.

Securing the module 200 directly to the host connector 600 (e.g., via the connector cover 650) can provide a number of advantages and/or benefits. For instance, contacts 618, 620, 254, 256 in the host connector 600 and module connector 200 mate with less tolerance stackup compared to contacts in host connectors and module connectors where the module is secured directly to the front panel of the host. Consequently, the lengths of the contacts 618, 620, 254, 256 in the host connector 600 and module connector 200 can be relatively shorter compared to contacts in conventional host connectors and module connectors and can include shorter stubs, resulting in improved high speed signal integrity and improved EMI performance.

As another advantage, the direct coupling of the module 200 to the host connector 600 allows the use of an elastomeric EMI gasket 680A to form an EMI seal at the interface of the module 200 with the host connector 600. In particular, the use of EMI gaskets such as EMI gasket 680A often requires tight mechanical tolerances at a compression interface, enabled in embodiments of the invention by direct coupling the module 200 to the host connector 600. In contrast, in conventional systems where the module is directly coupled to the front panel of the host or latched to other host features, tolerance stackup in the plugging direction (e.g., the z-direction) must be compensated for at the interface between the module and the host connector, resulting in loose mechanical tolerances at the interface between the module and the host connector and preventing the effective use of an elastomeric EMI gasket.

Returning to FIGS. 6C and 6G, a plurality of through holes 664A and 664B are also defined in the connector cover 650 that extend from a top face 666 (FIG. 6C) of the connector cover 650 to the bottom face 656. Through holes 664A, 664B are positioned in the connector cover 650 asymmetrically about the reference line 663. However, through hole 664A and tapped hole 662B are positioned substantially symmetrically about the reference line 663. Similarly, through hole 664B and tapped hole 662A are positioned substantially symmetrically about the reference line 663.

The symmetry of each through hole 664A and 664B with a corresponding one of the tapped holes 662B and 662A, respectively, allows the host connector 600 to be used in belly-to-belly configurations without requiring additional screws, nuts, bolts, or other fasteners than are otherwise used in single-sided configurations. A cross-sectional view of an upper host connector ("host connector 600U") and a lower host connector ("host connector 600L") in a belly-to-belly configuration on a PCB 310 is disclosed in FIG. 6H.

For the belly-to-belly configuration, the host connector 600U is positioned right-side-up on top of the PCB 310 while the host connector 600L is positioned upside down on the bottom of the PCB 310. As shown, through hole 664A of the host connector 600U aligns with a fifth through hole 310E in the PCB 310 and with the tapped hole 662B of the host connector 600L. Similarly, through hole 664B of the host connector 600L aligns with a sixth through hole 310F in the PCB 310 and with the tapped hole 662A of the host connector 600U. Although not shown, corresponding through holes and/or tapped holes in the host connector 600U, PCB 310 and host connector 600L can be aligned on the other side of the host connectors 600U and 600L.

After the through holes and tapped holes in the host connector 600U are aligned with corresponding through holes in the PCB 310 and corresponding tapped holes and through holes in the host connector 600L, fasteners can be inserted through one or more of the sets of aligned holes to secure the host connectors 600U, 600L and the PCB 310 together. For instance, fastener 668 can be inserted into the aligned set of holes including through hole 664A of the host connector 600U, through hole 310E of the PCB 310, and tapped hole 662B of the host connector 600L.

Figure 6H:
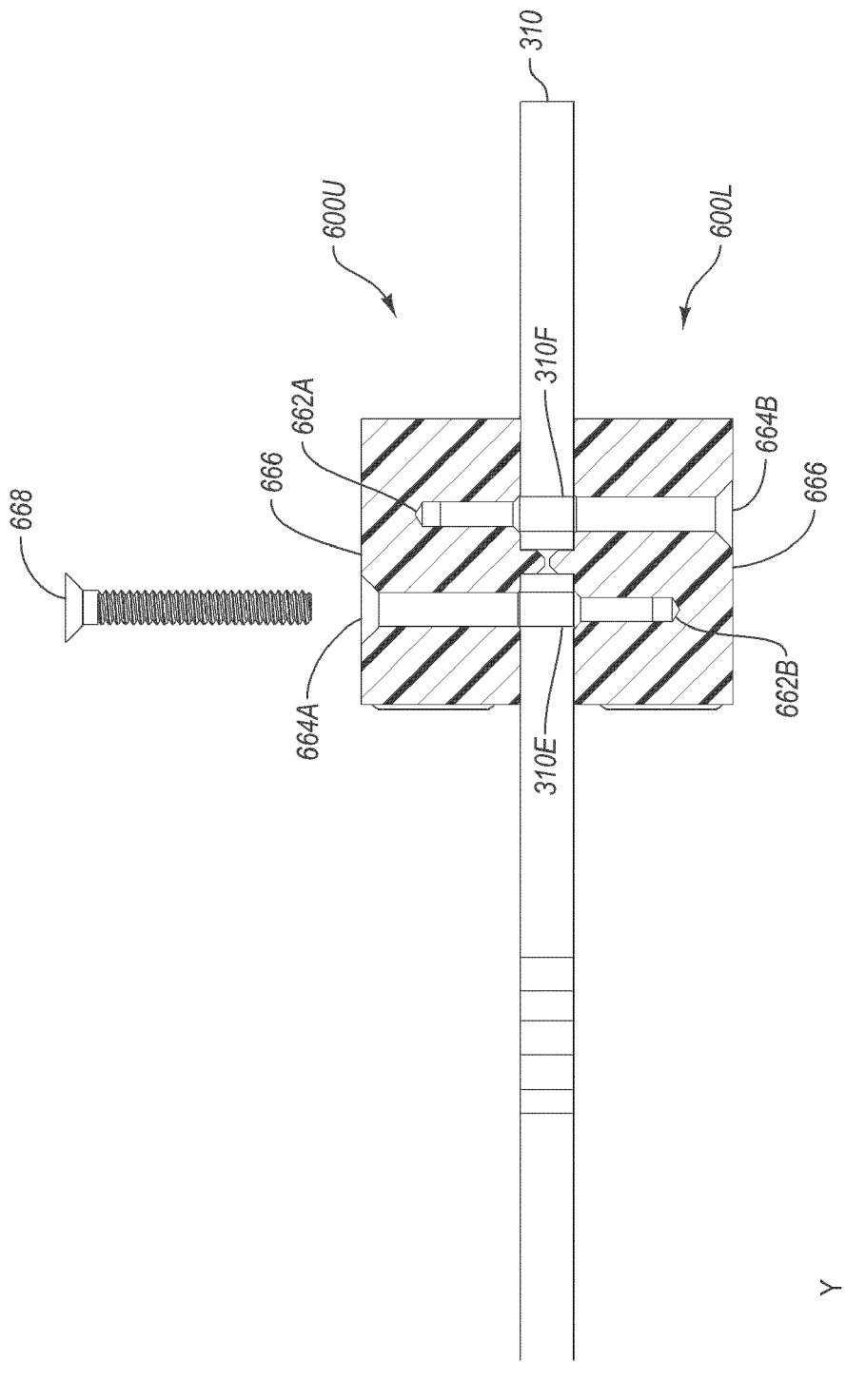

The belly-to-belly configuration includes four sets of aligned holes, only two of which are shown in FIG. 6H, between the host connector 600U, PCB 310, and host connector 600L. The four sets of aligned holes include two sets that can be accessed from the top face 666 of host connector 600U and two sets that can be accessed from the top face 666 of host connector 600L. In some embodiments, only two fasteners 668 are used to secure the host connector 600U, PCB 310, and host connector 600L together. For instance, fasteners can be inserted through each of the two sets of aligned holes accessed from the top face 666 of host connector 600U. Alternately, fasteners can be inserted through each of the two sets of aligned holes accessed from the top face 666 of host connector 600L Alternately, fasteners can be inserted through each of the four sets of aligned holes for a total of four fasteners.

In a single-sided configuration, two fasteners can similarly be used to secure a host connector 600 to a single side of the PCB 310. In this embodiment, one fastener can be inserted through the PCB 310 into each of the tapped holes 662A and 662B. However, the two fasteners used in the single-sided configuration can be shorter than the two fasteners used in the belly-to-belly configuration.

Figure 7A:
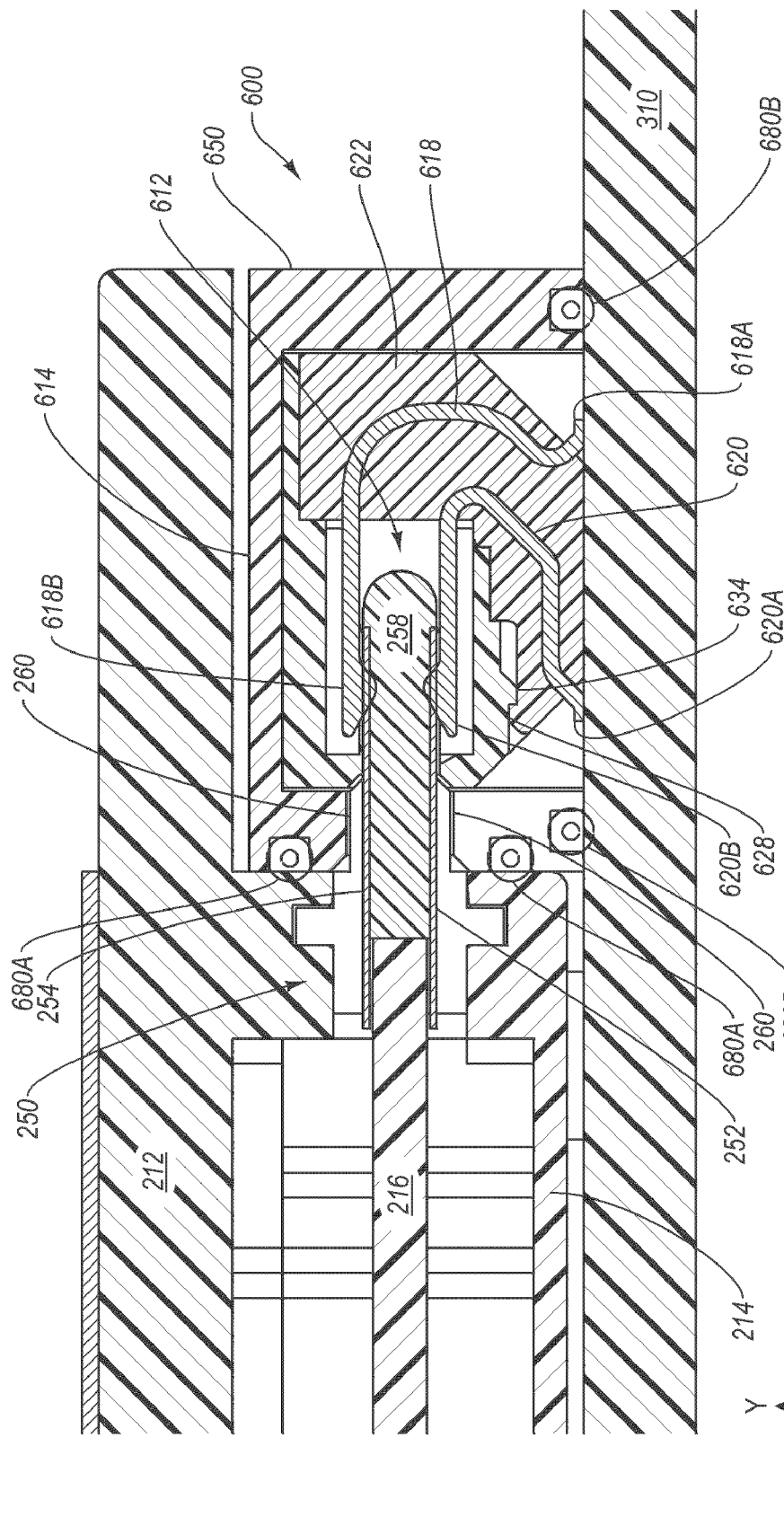
FIGS. 7A-7B disclose aspects of a mechanical platform according to embodiments of the invention when the pluggable optoelectronic module is plugged into the host device.

Returning to FIG. 6G, the connector cover 650 additionally includes a first channel 670 defined in the front face 660 of the connector cover 650 and a second channel 672 defined in the bottom face 656. The first channel 670 is configured to receive EMI gasket 680A and the second channel 672 is configured to receive EMI gasket 680B. The channels can be sufficiently large in some embodiments to allow the use of hollow EMI gaskets, as seen in FIG. 7A. The use of hollow EMI gaskets 680A, 680B can reduce the compression force for compressing the EMI gaskets 680A, 680B to form an EMI shield at the front face 660 and bottom face 656.

III. Assembly and Insertion

With combined reference to FIGS. 1-7B, additional details regarding the module 200 and host 300 are provided. FIG. 7A is a cross-sectional view of the back end of a module 200 coupled to a host PCB 310 disclosing details of the mechanical and electrical interface between the module 200 and the host PCB 310. Illustrated in the cross-sectional view of FIG. 7A are the top shell 212, bottom shell 214, and PCB 216 of the module 200, as well as the module connector 250. The cross-sectional view of FIG. 7A additionally illustrates the host PCB 310 and host connector 600 of the host 300.

In a typical assembly process of the host connector 600, contacts 618, 620 are partially enclosed in chicklets 622. This may include overmolding the chicklets 622 over the contacts 618, 622. Each chicklet 622 and pair of contacts 618, 620 can be inserted into the connector body 614, the hook feature 628 of each chicklet 622 engaging a corresponding hook feature 634 in the connector body 614. Once all the chicklets 622 and contacts 618, 620 have been inserted into the connector body 614, the connector core 610 is formed, the arms 618B, 620B of the connectors 618, 622 extending into the recessed slot 612 of the connector core 610. The assembled connector core 610 would typically be provided pre-assembled by a connector manufacturer for use in the host 300.

The assembled connector core 610 can then be positioned on the host PCB 310, aligning the feet 618A, 620A of the contacts 618, 620 with corresponding contact pads on the host PCB 310. The configuration of the connector core 610 with a recessed slot 612 rather than a protruding slot common in conventional host connectors allows the connector core 610 to be positioned on the host PCB 310 for reflow soldering or some other coupling process without concern that the connector core 610 will topple over. The connector core 610 configuration additionally allows solder joints formed between the feet 618A, 620A and corresponding contact pads on the host PCB 310 to be visually inspected for quality control. Further, the connector core 610 configuration permits a one-piece connector cover 650 to be implemented, as the connector core 610 can be received into the cavity 652 defined in the connector cover 650 via the opening 654 defined in the bottom face 656 of the connector cover 650. The one piece connector cover 650 is installed over the connector core 610 with a simple, vertical assembly motion.

Prior to assembling the connector cover 650 over the connector core 610 on the host PCB 310, EMI gaskets 680A, 680B are positioned in the channels 670, 672 defined in the front face 660 and bottom face 656 of the connector cover 650. Once so assembled, the connector cover 650 is dropped over the connector core 610 onto the host PCB 310 where it can be secured using one or more fasteners.

Host guides 500A, 500B are positioned and secured on the host PCB 310. The host bezel 400 is secured directly to the host guides 500A, 500B through the front panel 312, the opening 403 of the host bezel 400 being aligned with the oversized opening of the front panel 312 and the position of the front panel 312 being adjustable relative to the position of the host bezel 400 and host guides 500A, 500B. The direct coupling of the host guides 500A, 500B to the host bezel 400 can compensate for host PCB 310 tolerances, as already explained above, and can alternately or additionally increase the rigidity of the host 300. In contrast, in a conventional system without host bezels, the large openings in the front panel of the host for receiving pluggable modules would compromise the rigidity of the host 300. Moreover, in some embodiments, fastening the host bezel 400 directly to the host guides 500A and 500B ensures proper alignment of the host bezel 400 relative to the host guides without requiring precise alignment with the front panel 312.

When a user desires to plug the module 200 into the host 300, the user aligns the guiderails 222, 224 with cutouts 405, 404 in the host bezel 400 and channels 508A, 508B in host guides 500A, 500B. As the module 200 is pushed through the opening 403 defined in the host bezel 400, the guiderails 222, 224 run along the cutouts 405, 404 and channels 508A, 508B until the back of the module 200 mates with the front of the host connector 600 (e.g., the front surface 660 of the connector cover 650). At that time, the user may exert an inward pressure on the thumbscrews 226, 228 to overcome the outward biasing effect of the compression springs 232, 234, which will cause the screw ends 226A, 228A to enter the tapped holes 663A, 663B of the host connector 600. The user may then tighten the thumbscrews 226, 228 to securely fasten the module 200 into the host 300.

In the insertion position illustrated in FIG. 7A, the tongue 258 of the module connector 250 is received into the recessed slot 612 of the host connector 600. The arm 618B of the contact 618 is coupled to the upper contact 254 of the module connector 250. Similarly, the arm 620B of the contact 620 is coupled to the lower contact 256 of the module connector 250. The shoulder 260 of the module connector 250 extends into the recessed slot 612 of the host connector 600, enclosing the contacts 618, 620 and/or 254, 256 in plastic dielectric in some embodiments and reducing and/or preventing the exposure of the contacts 618, 620 and/or 254, 256 to air.

As seen in FIG. 7A, the thickness of the tongue 258 is greater than the thickness of the PCB 216, although this is not required in all embodiments. The greater thickness of the tongue 258 allows the use of straight contacts 254, 256, rather than joggled contacts as already mentioned above.

As previously described, the host connector 600 provides a hardstop for the module 200, such that the module connector 250 and host connector 600 mate with less tolerance stackup compared to conventional systems where the front panel of the host provides the hardstop. Instead, most of the tolerance stackup of the module 200 insertion into the host 300 is compensated for at the front of the module 200 in some embodiments.

Figure 7B:
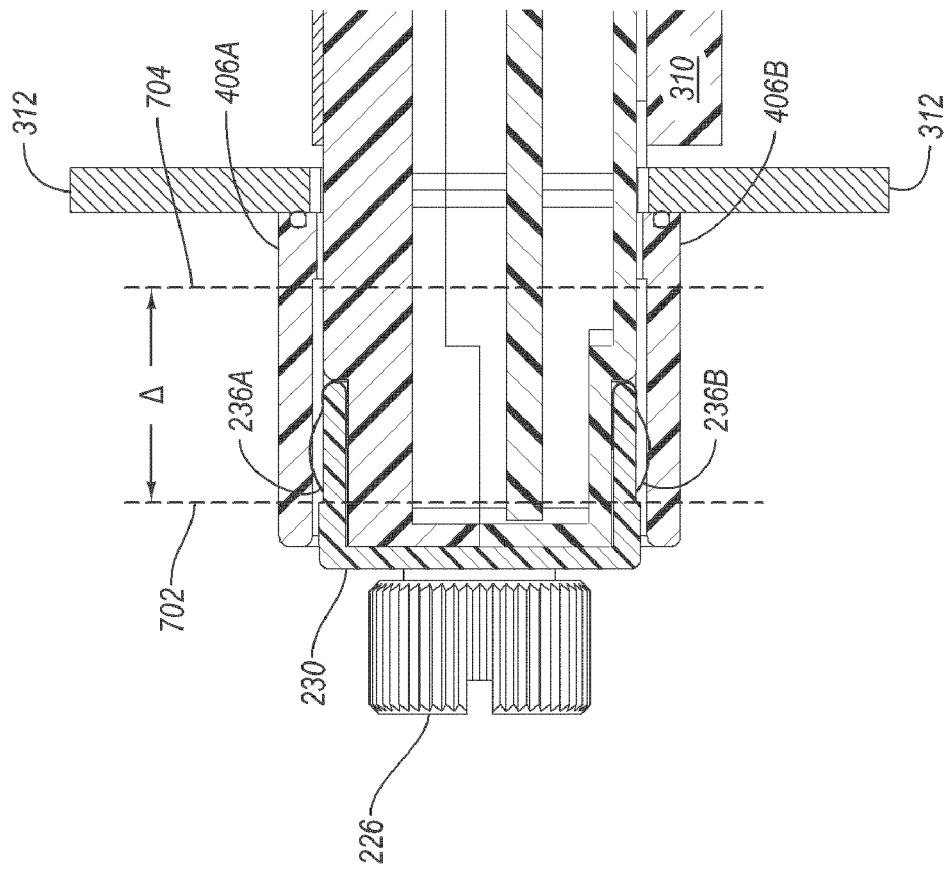

For instance, FIG. 7B discloses a cross-sectional view of the module 200 inserted through the opening 403 defined in the host bezel 400 and the oversized opening defined in the front panel 312. FIG. 7B further discloses an upper EMI finger 236A and a lower EMI finger 236B of the EMI collar 236. When the module 200 is inserted into the host 300, the upper EMI finger 236A is compressed and wipes the inner surface of the top 406A of host bezel 400, while the lower EMI finger 236B is compressed and wipes the inner surface of the bottom 406B of host bezel 400. The wiping contact of the EMI fingers 236A, 236B with the inner surfaces of the rim 406 forms an EMI shield at the interface of the module 200 with the host bezel 400.

Because the contact between the EMI gasket 236 and the host bezel 400 is a wiping contact, rather than a compression contact, the host bezel 400 and EMI collar 236 can compensate for a significant tolerance stackup, illustrated as the distance Δ in FIG. 7B. In other words, so long as the tolerance stackup in the module 200 and host 300 results in the EMI fingers 236A, 236B being positioned somewhere between the reference lines 702, 704 separated by the distance Δ, the EMI fingers 236A, 236B and the rest of the EMI collar 236 can form an adequate EMI shield with the host bezel 400.

Alternately or additionally, the maximum tolerance stackup in the module 200 and/or host 300 can be less than Δ in some embodiments. When Δ is greater than the maximum tolerance stackup, the mechanical platform 100, including the module 200 and host 300, can accommodate front panels 312 with a range of thicknesses. For instance, in some embodiments the mechanical platform 100 can accommodate front panels 312 with thicknesses anywhere from 1 millimeter to 3 millimeters. The accommodation of different front panel 312 thicknesses allows different front panel manufacturers to manufacture front panels 312 with different thicknesses.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A host device for receiving a pluggable optoelectronic module, comprising:
   a host bezel defining an opening configured to receive a module when the module is plugged into the host device, the host bezel including a first cutout on a first side of the opening and a second cutout on a second side of the opening opposite the first side, the first and second cutouts adapted to receive first and second guiderails of the module;
   a first guide and a second guide coupled to the host bezel at front ends of the first guide and the second guide and to a host printed circuit board, the first guide defining a first channel and the second guide defining a second channel, the first and second channels configured to receive the first and second guiderails of the module; and
   a host connector coupled to the host printed circuit board and disposed at a back end of the first guide and the second guide, the host connector including a recessed slot configured to receive a protruding portion of a module connector for electrically coupling the module to the host printed circuit board.

2. The host device of claim 1, further comprising a heatsink configured to be removably coupled to the first guide and the second guide and to dissipate heat away from the module when the module is plugged into the host device.

3. The host device of claim 2, wherein a plurality of shoulder screws are configured to removably couple the heatsink to the first guide and the second guide.

4. The host device of claim 3, further comprising a plurality of compression springs configured to bias the heatsink against the top surface of the module.

5. The host device of claim 1, wherein the host connector includes a front face and when the module is plugged into the host device, the front face of the host connector is configured to mate with a back end of the module and stop the module from proceeding further inward into the host device.

6. The host device of claim 1, wherein the host bezel comprises a first host bezel, the module comprises a first module, and the host connector comprises a first host connector, the host device further comprising a second host bezel, a third guide and a second guide, and a second host connector disposed immediately beneath the first host bezel, the first guide and the second guide, and the first host connector and configured to receive a second module when plugged into the host device in a belly-to-belly configuration with the first module.

7. The host device of claim 1, further comprising a front panel disposed between the host bezel and the guides, the front panel defining an opening configured to receive the module when the module is plugged into the host device.

8. The host device of claim 7, wherein the opening defined in the front panel is larger than the opening defined in the host bezel and wherein the front panel can be moved relative to the host bezel and the guides.

9. A host bezel, comprising:
   a base configured to be coupled to a host device and defining an opening configured to receive a module when the module is plugged into the host device;
   a first cutout formed on a first side of the opening and a second cutout formed on a second side of the opening opposite the first side, the first and second cutouts configured to receive first and second guiderails of the module; and
   a rim extending forward away from the base and configured to form a wiping contact shield with the module against leakage of electromagnetic interference through an interface between the rim and the module.

10. The host bezel of claim 9, wherein the rim includes a top, bottom, and two sides arranged in a rectangular shape, the host bezel further comprising a plurality of through holes formed in the base, one in each of the corners formed by the rim, each of the through holes configured to receive a fastener for securing the host bezel to the host device.

11. The host bezel of claim 10, wherein the host device includes a first guide and a second guide, each of the first guide and the second guide defining a channel configured to receive first and second guiderails of the module, wherein the through holes are configured to receive fasteners for securing the host bezel directly to the first guide and the second guide.

12. The host bezel of claim 9, wherein the opening is asymmetric and is complementary to a cross-section of the module, the asymmetric opening being configured to prevent the module from being plugged into the host device improperly.

13. The host bezel of claim 9, further comprising a channel formed in the base and configured to receive a gasket, the gasket being configured to form a shield against leakage of electromagnetic interference through an interface between the host bezel and the host device.

14. A host guide, comprising:
   a first end including one or more flanges, each flange of the first end configured to secure the host guide to a first side of a host bezel in a host device when the host guide has a first orientation;
   a length member coupled to the first end; and
   a second end coupled to the length member and including one or more flanges, each flange of the second end configured to secure the host guide to a second side of the host bezel when the host guide has a second orientation;
   wherein the first end, length member, and second end define a channel configured to receive a guiderail on a side of a module when the module is plugged into the host device.

15. The host guide of claim 14, further comprising one or more posts extending downwards from a bottom of the host guide and configured to be received within one or more corresponding cavities defined in a host printed circuit board of the host device and to position the host guide on the host printed circuit board during assembly of the host device.

16. The host guide of claim 14, further comprising a first tapped hole formed in the first end and a second tapped hole formed in the second end, the first tapped hole and the second tapped hole extending downward from a top of the host guide and configured to receive fasteners for securing a heatsink to the host guide.

17. The host guide of claim 14, wherein the host guide comprises a first host guide, the first host guide further comprising a first through hole and first tapped hole formed in the first end, and a second through hole and second tapped hole formed in the second end, the first through hole, first tapped hole, second through hole, and second tapped hole positioned to allow the first host guide to be arranged in a belly-to-belly configuration with a second host guide that is substantially identical in configuration to the first host guide.

18. The host guide of claim 17, wherein the position of the first through hole, first tapped hole, second through hole, and second tapped hole of the first host guide and a corresponding first through hole, first tapped hole, second through hole, and second tapped hole of the second host guide allow:
   the first host guide and second host guide to be secured to a host printed circuit board in the belly-to-belly configuration using two fasteners of a first length; or
   the first host guide to be secured to the host printed circuit board in a single-sided configuration using two fasteners of a second length, the second length being shorter than the first length.

19. A host connector, comprising:
   a connector core defining a recessed slot configured to receive a module connector, the connector core including a plurality of contacts, each contact including a foot configured to be soldered to a corresponding solder pad on a host printed circuit board and an arm configured to be coupled to a corresponding contact on the module connector, the connector core further configured to allow visual inspection of a plurality of solder joints formed by soldering the contact feet to the corresponding solder pads on the host printed circuit board; and
   a connector cover defining a cavity configured to receive the connector core, the cavity accessible via a first opening defined in a bottom face of the connector cover and a second opening defined in a front face of the connector cover.

20. The host connector of claim 19, wherein the connector cover includes metal.

21. The host connector of claim 19, further comprising:
   a first gasket configured to be received in a channel defined in the bottom face of the connector cover and to form a shield against leakage of electromagnetic interference through an interface between the host connector and the host printed circuit board; and
   a second gasket configured to be received in a channel defined in the front face of the connector cover and to form a shield against leakage of electromagnetic interference through an interface between the host connector and a module coupled to the module connector.

22. The host connector of claim 19, wherein the connector core further includes a connector body and a plurality of chicklets, each chicklet partially enclosing a pair of contacts.

23. The host connector of claim 22, wherein each chicklet includes a hook feature configured to engage a corresponding hook feature in the connector body when the chicklet is inserted into the connector body during assembly.

24. The host connector of claim 22, wherein at least one of the contacts in each pair of contacts partially enclosed by each chicklet has a u-shape.

25. The host connector of claim 19, wherein the connector cover includes a plurality of tapped holes extending backwards from the front face, each tapped hole configured to receive a threaded end of a thumbscrew in a module for securing the module to the host connector.

26. The host connector of claim 19, wherein the thumbscrews are configured to secure the module against the front face of the host connector.

27. The host connector of claim 19, wherein the host connector comprises a first host connector, the first host connector further comprising a first through hole and a second through hole extending from the bottom face to a top face of the connector cover and a first tapped hole and a second tapped hole extending upward from the bottom face, wherein:
   the first through hole and first tapped hole are positioned on one side of the connector cover and the second through hole and second tapped hole are positioned on another side of the connector cover;
   the first through hole, first tapped hole, second through hole, and second tapped hole are further positioned to allow the first host connector to be arranged in a belly-to-belly configuration with a second host connector that is substantially identical in configuration to the first host connector.

28. The host connector of claim 27, wherein the position of the first through hole, first tapped hole, second through hole, and second tapped hole of the first host connector and a corresponding first through hole, first tapped hole, second through hole, and second tapped hole of the second host connector allow:
   the first host connector and second host connector to be secured to the host printed circuit board in the belly-to-belly configuration using two fasteners of a first length; or
   the first host connector to be secured to the host printed circuit board in a single-sided configuration using two fasteners of a second length, the second length being shorter than the first length.

* * * * *